US005479603A

United States Patent [19]
Stone et al.

[11] Patent Number: 5,479,603
[45] Date of Patent: Dec. 26, 1995

[54] METHOD AND APPARATUS FOR PRODUCING A COMPOSITE SECOND IMAGE IN THE SPATIAL CONTEXT OF A FIRST IMAGE

[75] Inventors: Maureen C. Stone, Los Altos; Eric A. Bier, Mountain View; Kenneth P. Fishkin, Redwood City, all of Calif.; Anthony DeRose, Seattle, Wash.

[73] Assignee: Xerox Corporation, Stamford, Conn.

[21] Appl. No.: 96,193

[22] Filed: Jul. 21, 1993

[51] Int. Cl.$^6$ ................................................. G06F 15/72
[52] U.S. Cl. ................................................. 395/161
[58] Field of Search .................................. 395/135, 155, 395/161; 345/13, 15, 118

[56] References Cited

U.S. PATENT DOCUMENTS

| | | | |
|---|---|---|---|
| 4,800,379 | 1/1989 | Yeomans | 340/731 |
| 5,021,976 | 6/1991 | Wexelblat et al. | 364/521 |
| 5,283,560 | 2/1994 | Bartlett | 345/113 |
| 5,341,466 | 8/1994 | Perlin et al. | 395/139 |

FOREIGN PATENT DOCUMENTS 0544509  6/1993  European Pat. Off. ........ G06F 15/72

OTHER PUBLICATIONS

Bier, E. and Freeman, S., "MMM: A User Interface Architecture for Shared Editors on a Single Screen" in the *Proceedings of the ACM SIGGRAPH Symposium on User Interface Software and Technology* (Hilton Head, S.C., Nov. 11–13, 1991), ACM, New York, 1991, pp. 79–86.

D. Swinehart et al., "A Structural View of the Cedar Programming Environment", *ACM Transactions on Programming Languages and Systems*, vol. 8, No. 4, Oct. 1986, pp. 419–490.

Teitelman, W., "A Tour Through Cedar", *IEEE Software*, vol. 1, No. 2, Apr., 1984, pp. 44–73.

K. Pier et al., "An Introduction to Gargoyle: An interactive Illustration Tool", *Proceedings of the Intl. Conf. on Electronic Publishing, Document Manipulation and Typography*, (Nice, France, Apr.) Cambridge University Press, 1988, pp. 223–238.

"Kaleida Launches Alliance", in Digital Media, Mar. 29–Apr. 26, 1993, pp. 12–16.

Beck, K., Becher, J. and Liu, Zaide, "Integrating Profiling into Debugging", *1991 International Conference on Parallel Processing*, vol. II, Software, H. Schwetman, ed., Penn State University, CRC Press, Aug. 12–16 1991, pp. II–284–II–285.

(List continued on next page.)

*Primary Examiner*—Phu K. Nguyen
*Attorney, Agent, or Firm*—Judith C. Bares

[57] ABSTRACT

A method is disclosed for operating a processor-controlled machine to produce a composite view of an original, or first, image by combining the functions of multiple viewing operations and using the model data structure from which the first image was produced (called the "FIMDS".) A first viewing operation region (1VOR) in a first viewing position in the display area of the display device has displayed in the 1VOR a second image produced according to a first viewing operation (VO1), associated with the 1VOR, that maps the FIMDS to image definition data defining the second image. Request signal data is received from a signal source to present a second viewing operation region (2VOR) in the display area coextensive with at least a portion of the 1VOR, forming a composite viewing operation region in the overlapping region. The 2VOR has a second viewing operation (VO2) associated with it for mapping an input model data structure, typically but not necessarily the FIMDS, to image definition data defining a second image for display in the 2VOR (2VOR-SI), providing an alternate view of the FIMDS that is different from that provided by the VO1 associated with the 1VOR. In response to the request signal data, a composite viewing operation, composed from the functions of the VO1 and the VO2, maps the FIMDS to image definition data defining a composite image for display in the composite viewing operation region substantially at the same time as the first image is being displayed in the display area. This gives the perception to the machine user of applying composed viewing operations to information presented in the original image.

26 Claims, 19 Drawing Sheets

OTHER PUBLICATIONS

Brown, Marc H., Meehan, James R., and Sarkar, Manojit, "Graphical Fisheye Views of Graphs", Digital Systems Research Center Reports, videotape produced by Digital Systems Research Center, Palo Alto, Calif., Jul. 1, 1992.

Haberli, Paul, copy of facsimile image sent in private communication to Maureen C. Stone, Nov. 25, 1992.

LaLonde, Wilf & Pugh, John, "Graphics Through the Looking Glass", in *Journal of Object Oriented Programming*, Aug./Sep., 1988, pp. 52–58.

Krasner, Glenn E., and Pope, Stephen T., "A Cookbook for Using the Model–View–Controller User Interface Paradigm in Smalltalk–80", in *Journal of Object Oriented Programming*, Aug./Sep., 1988, pp. 26–49.

Fairchild, Kim, Meredith, Greg, and Wexelblat, Alan, "A Formal Structure for Automatic Icons", in *Interacting With Computers*, vol. 1, No. 2 (1989), pp. 131–140.

Lin, Jin–Kun, "MediaMosaic–A Multimedia Editing Environment", in Proceedings of the ACM Symposium on User Interface Software and Technology (UIST), Nov. 15, 1992, pp. 135–141.

Weyer, Stephen and Borning, Alan, "A Prototype Electronic Encyclopedia", in *ACM Transactions on Office Information Systems,* vol. 3, No. 1, Jan. 1985, pp. 63–88.

Sarkar, M., and Brown, M., "Graphical Fisheye Views of Graphs", in *ACM Conference on Human Factors in Computing Systems (CHI)*, May 1992, pp. 83–91.

Spence, R. and Apperly, M., "Data base navigation: an office environment for the professional", in *Behaviour and Information Technology,* 1982, vol. 1, No. 1, pp. 43–54.

*PC Paintbrush IV Plus*™ User Manual, ZSoft Corp., 1989, 1990, pp. v–x, 21–24, 72, 79,–80, 95–96, 139–148.

Perlin, Ken, and Fox, David, "Pad An Alternative Approach to the Computer Interface", draft of journal article received from K. Perlin by Xerox colleague in Apr., 1993 without obligation of confidentiality; later published in Aug., 1993; No Admission is Being Made Herein as to Whether This Draft Article is Prior Art; please see Information Disclosure Statement dated Oct. 4, 1994.

Broderbund "Spelunx" Software Program Guide, pp. 1–2, 21 and 24; four (4) screen display images of Tumnus room; one (1) screen display of software copyright notice; Copyright 1992, 1993 by Broderbund Software, Inc. and Cyan.

METHOD AND APPARATUS FOR PRODUCING A COMPOSITE SECOND IMAGE IN THE SPATIAL CONTEXT OF A FIRST IMAGE

CROSS REFERENCE TO OTHER APPLICATIONS

The present invention is related to other inventions that are the subject matter of concurrently filed, commonly assigned U.S. patent applications having the following serial numbers and titles: Ser. No. 08/096,521, "Method and Apparatus for Operating the Model Data Structure of an Image to Produce Human Perceptible Output in the Context of the Image", which is hereby incorporated by reference herein; Ser. No. 08/096,200, "Method and Apparatus for Operating an Object-Based Model Data Structure to Produce a Second Image in the Spatial Context of a First Image"; Ser. No. 08/095,974, "User-Directed Method for Operating on an Object-Based Model Data Structure Through a Second Contextual Image"; and Ser. No. 08/320,975, "Method for Operating on Objects in a First Image Using an Object-Based Model Data Structure to Produce a Second Contextual Image having Added, Replaced, or Deleted Objects".

1. Field of the Invention

The present invention relates generally to a method of operating a processor-controlled machine having a display for displaying images, and to a processor-controlled machine operated according to the method. More particularly, the present invention relates to producing a composite second image for display in the spatial context of a first displayed image by operating on the model data structure from which the first displayed image was produced, and using two or more displayed viewing operation regions for identifying the relevant portions of the image for which the composite second image is to be produced.

2. Background

A frequent and powerful use of a processor-controlled machine such as a computer is the presentation of information in the form of images on a display device connected to the machine. An image, which may include characters, words, and text as well as other display features such as graphics, is produced in a display area of the display device directly from an image definition data structure defining the image; the image definition data structure is typically stored in a memory area of the machine. One type of image format known as a raster image is composed of individual image locations commonly referred to as "pixels". The discussion of images herein will generally reference pixel data, but it is to be understood that other data formats, such as vector data, may also be used to define an image. The images discussed herein may be either static (having the appearance to a system operator or user of not moving), or animated, as, for example, in the case of a digital video image.

An image definition data structure alone carries relatively limited data about the information content of the image the data represent. However, for many images, the image definition data structure is itself generated from another data structure which contains information or data capable of being understood by a human or by a software operation such as an application program which is executed by the machine's processor. Such a data structure will be referred to herein as the "information model data structure" or the "model data structure", and is to be distinguished from the image definition data structure. Examples of information model data structures include scene description models used by rendering operations to produce graphics images such as photorealistic scenes; document models used by a word processing or other document manipulation application which contains the text, formatting instructions, and other data needed for producing a formatted document; graphical object data structures used by illustration and painting software programs; spreadsheet model data structures used by spreadsheet application programs for presenting spreadsheet images; and numerous application-specific models, such as those used for computer-aided engineering, simulation and manufacturing applications.

In some systems providing user access to the model data structure, a user may be able to access, and perhaps affect or manipulate, data and information that is not represented by display features currently visible in the original image by producing, through alternate functions defined by the application, a second or alternate view of an original displayed image. The second view may provided enhanced information about the model data structure, or the system may then permit interaction with data in the model through the display features present in the second view.

Typical of many of the systems implementing these types of multiple views of a model, the spatial relationship between the original image, the specification of the input content for the second image and the position of the second image in the display is not easy to visualize. While the specification of the input may be directly related to the first image (i.e. when the user can point to or select a region in the first image) this is not always the case as, for example, when the user has to type commands to specify a second image. Furthermore, once a selection is specified, the user either has no control over the location of the second image, or must reposition it in a separate step. Therefore, it can be difficult to understand how the second image is spatially related to the first image and to the model. Linking direct selection in the first image to the spatial position of the second image can make these relationships more clear. This can be especially important when the model is complex and can be viewed in many different ways. As systems supporting complex models, or sets of related models, are becoming more common, this problem is becoming more critical.

Copending, concurrently filed, commonly assigned U.S. patent applications Ser. No. 08/096,521, "Method and Apparatus for Using the Model Data Structure of an Image to Produce Human Perceptible Output in the Context of the Image" and Ser. No. 08/096,200, "Method and Apparatus for Using an Object-Based Model Data Structure to Produce a Second Image in the Spatial Context of a First Image" solve this problem of providing a second view of an original image in the spatial context of the original image by providing methods for operating a processor-controlled machine that operate on a model data structure from which a first image has been produced in order to produce a second image for display in the spatial context of the first image. A viewing operation region (VOR) is displayed coextensively with a first image segment of the first image in the display area of the machine's display device. The first image segment includes a a display feature representing a model data item in the model data structure. In response to the display of the VOR, the method operates on the model data item in the model data structure to produce a second image for display in the VOR showing information related to the display feature in the original image.

As shown in Ser. No. 08/096,521 and Ser. No. 08/096,200, multiple views of the same original image may be displayed by using more than one VOR positioned over different parts of the original image. A viewing operation associated with each VOR maps the model data structure that produced the original, or first, image, to the second image that provides the second view in the VOR. For example, a viewing operation may provide a modified view of the first image, such as by modifying a display feature such as the "solid" or "broken" display of a line or the color of an object. For a viewing operation to map the appropriate data items in the model data structure to achieve both modifications in the second view, a new viewing operation associated with a VOR would have to be implemented to perform both modifications. This could lead to the proliferation of specially-implemented VORs with associated viewing operations in order to produce views of the original image having composite modifications or other composite operations, making such composite views more difficult to implement in an easy and intuitive manner.

EPO 0 544 509, entitled "Photographic Filter Metaphor for Control of Digital Image Processing Software", discloses an example of the display of a composite second image in the spatial context of a first image. EPO 0 544 509 discloses a method and interactive user interface for displaying an image on a display device, selecting a filter for overlaying on a portion of the image, modifying for display the portion of the image overlaid by the filter while preserving the image as it appeared before modification, displaying the modified filtered portion of the image and retrieving the image as it appeared before the modification. Predetermined or custom designed filter functions may be moved over an image and over each other to produce a modified visual display showing the effect of the filter or filters on the image without altering the actual image. Examples of filters include gamma, convolution, mixer, halftone, rotation, scaling and geometric filters which provide a variety of digital image processing effects.

Operations on the image pixel data structure alone, such as disclosed in EPO 0 544 509, provide versions and views of the first image which are limited strictly to manipulations of pixel values. So, while the software implementation of image processing filters provides some desirable features for generating the display of a composite alternate view of an original image, the range of information content possible in the second image which is derived directly from the image pixel data structure of the first image is necessarily limited to versions and views of the first image which result only from operating on the pixel values. For information available from the information model data structure of the first image, the methods used for operating on the image pixel data structure to produce image (pixel) magnification are not transferable. As a result, such methods are inoperable for general use in accessing alternative views of an information model data structure.

SUMMARY OF THE INVENTION

The present invention provides an improvement for the processor controlled methods disclosed in Ser. No. 08/096,521 and Ser. No. 08/096,200 by composing, or combining, the functions of multiple viewing operations operating on the model data structure that produced an image in order to produce a single composite image displayed in the context of the original image. The composite image produced from composing the viewing operations may be an aesthetically enhanced image; or it may provide information from the first image model data structure displayed in a new manner or organization; or it may present new information from the first image model data structure not presented in the first image. The present invention may operate in the same user interface environment described in relation to the methods disclosed in Ser. No. 08/096,521 and Ser. No. 08/096,200.

The present invention is a method of operating a processor-controlled machine that includes a signal source for producing signals indicating image display requests, output circuitry connected to a display having a display area for presenting images, memory for storing data, and a processor connected for receiving the signals from the signal source, connected for providing data defining images to the output circuitry, and connected for accessing the data stored in the memory. The display area has a first image displayed in a present image position of the display area. The data stored in the memory of the processor-controlled machine include instruction data indicating instructions the processor executes, and a first image model data structure from which the first image was produced. Note that the term "first image" will be used herein interchangeably with the term "original image".

For purposes of describing the invention and all of its embodiments in as concise a manner as possible, Table 1 lists some elements of the present invention with their respective abbreviations. These abbreviations will be used in the remainder of the specification when referring to these elements.

TABLE 1

Abbreviations

| Abbreviation | Element |
| --- | --- |
| 1VOR | a first viewing operation region |
| 1VOR-SI | a second image produced for display in the first viewing operation region |
| VO1 | a first viewing operation |
| 2VOR | a second viewing operation region |
| 2VOR-SI | a second image produced for display in the second viewing operation region |
| VO2 | a second viewing operation |
| C1 + 2VOR | a composite viewing operation region defined by the coextensively positioned portions of the first viewing operation region and the second viewing operation region in the display area |
| C1 + 2VOR-SI | a composite second image produced for display in the composite viewing operation region |
| 1VOR-NC | the non-composite first viewing operation region, or the remaining portion of the first viewing operation region that is outside the composite viewing operation region |
| 1VOR-NC-SI | a second image produced for display in the non-composite portion of the first viewing operation region |
| 2VOR-NC | the non-composite second viewing operation region, or the remaining portion of the second viewing operation region that is outside the composite viewing operation region |
| 2VOR-NC-SI | a second image produced for display in the non-composite portion of the second viewing operation region |
| nVOR mVOR | in general, for multiple viewing operation regions, n and m correspond to, respectively, the nth and mth viewing operation regions displayed |
| Cm + nVOR | in general, for multiple viewing operation regions, Cm + nVOR corresponds to the composite viewing operation defined by the coextensively positioned portions of the mth viewing operation region and the nth viewing operation region in the display area |

The method of the present invention begins operation having a first viewing operation region (1VOR) in a first viewing position in the display area of the display device, positioned coextensively with the present image position of a first image segment of a first image. The 1VOR has a first viewing operation (VO1) associated with it for mapping a first image model data structure, from which the first image was produced, to image definition data defining a second image for display in the 1VOR (1VOR-SI). The 1VOR-SI has size and shape dimensions substantially identical to size and shape dimensions of the 1VOR, and is presented in the 1VOR substantially at the same time as the first image is being displayed in the display area.

The method of the present invention comprises a set of acts for producing an alternate view of the original image composed from the mappings of two viewing operations on the first image model data structure. Request signal data is received from the signal source indicating a display request to present a second viewing operation region (2VOR) in a second viewing position in the display area coextensive with the first viewing position of at least a portion of the 1VOR. The 2VOR has a second viewing operation (VO2) associated with it for mapping an input model data structure, typically the first image model data structure, to image definition data defining a second image for display in the 2VOR (2VOR-SI), the 2VOR-SI providing an alternate view of the first model data structure different from that provided by the VO1 associated with the 1VOR. Then, in response to the request signal data indicating the second display request, size and shape dimensions in the display area are determined for the portion of the 2VOR in the second viewing position coextensive with the first viewing position of the 1VOR, designated as a composite viewing operation region (C1+2VOR), using the first and second viewing positions of the 1VOR and the 2VOR, respectively. Then, a composite viewing operation is composed from the VO1 and the VO2, the composite viewing operation mapping the first image model data structure to image definition data defining a second image for display in the C1+2VOR (designated as a composite image, or C1+2VOR-SI) according to combined mappings of the VO1 and the VO2 on the first image model data structure. Next, the image definition data defining the C1+2VOR-SI is produced according to the composite viewing operation, using the size and shape dimensions of the C1+2VOR and the first image model data structure. The C1+2VOR-SI has substantially the same size and shape dimensions of the C1+2VOR. The image definition data defining the C1+2VOR-SI is then provided to the output circuitry connected to the display so that the display presents the C1+2VOR-SI in the C1+2VOR substantially at the same time as the first image is being displayed in the display area. The method of the present invention, when the composite second image (C1+2VOR-SI) is presented in the C1+2VOR, thus gives the perception to the machine user of showing the results of applying the composed viewing operations to information presented in the first image segment of the original first image.

Another aspect of the present invention provides additional "second" or alternate views of the original image in the remaining non-composite portions of the 1VOR and the 2VOR. Further in response to the second request signal data, size and shape dimensions of a remaining portion in the display area of the 1VOR in the first viewing position outside the second viewing position of the 2VOR, designated as a non-composite first viewing operation region (1VOR-NC), are also determined using the first and second viewing positions of the 1VOR and the 2VOR, respectively. In addition, size and shape dimensions of a remaining portion of the 2VOR in the second viewing position outside the C1+2VOR, designated as a non-composite second viewing operation region (2VOR-NC) are determined, also using the first and second viewing positions of the 1VOR and the 2VOR. Then, image definition data defining a second image for display in the 1VOR-NC (1VOR-NC-SI) is produced according to the VO1 using the first image model data structure and the size and shape dimensions of the 1VOR-NC, and image definition data defining a second image (2VOR-NC-SI) for display in the 2VOR-NC is produced according to the VO2 using the first image model data structure and the size and shape dimensions of the 2VOR-NC. Next, the image definition data defining the 1VOR-NC-SI and the 2VOR-NC-SI are provided to the output circuitry connected to the display so that the display presents the 1VOR-NC-SI in the 1VOR-NC and presents the 2VOR-NC-SI in the 2VOR-NC substantially at the same time as the C1+2VOR-SI is being displayed in the C1+2VOR and the first image is being displayed in the display area. Presentation of the 1VOR-NC-SI, the 2VOR-NC-SI, and the C1+2VOR-SI substantially simultaneously gives the perception to the machine user of providing multiple views of the first image related to information in respective first image segments coextensive with viewing positions of the 1VOR-NC, C1+2VOR and 2VOR-NC in the display area.

In accordance with still another aspect of the present invention, a specific manner in which the viewing operations of multiple viewing operation regions may be composed involves creating a second model data structure from the first image model data structure. The second model data structure may be a model data structure of the same type as, or similar to, the first image model data structure, as, for example, when the second model data structure is copied from the first image model data structure. Or, the second model data structure may be of a different data structure type. The first set of acts for generating the first alternate view of the original image includes producing a second model data structure using the first image model data structure according to the first viewing operation, and then producing the image definition data defining the 1VOR-SI using the second model data structure. Then, in response to the second request signal data indicating the second display request, size and shape dimensions in the display area of the C1+2VOR are determined, using the first and second viewing positions of the 1VOR and the 2VOR, respectively. Then, image definition data defining a composite second image for display in the C1+2VOR (C1+2VOR-SI) is produced according to the VO2 and using the second model data structure and the size and shape dimensions of the C1+2VOR. Next, the image definition data defining the C1+2VOR-SI is provided to the output circuitry connected to the display so that the display presents the C1+2VOR-SI in the C1+2VOR substantially at the same time as the first image is being displayed in the display area.

In another aspect of the invention involving producing a second model data structure, the act of producing the image definition data defining a composite second image for display in the C1+2VOR may involve a third model data structure produced from the second one, in a manner similar to that described above for the second model data structure.

The novel features that are considered characteristic of the present invention are particularly and specifically set forth in the appended claims. The invention itself, however, both as to its organization and method of operation, together with its advantages, will best be understood from the following description of the illustrated embodiment(s) when read in connection with the accompanying drawings. In the Figures, the same numbers have been used to denote the same component parts or acts.

Figure 1:
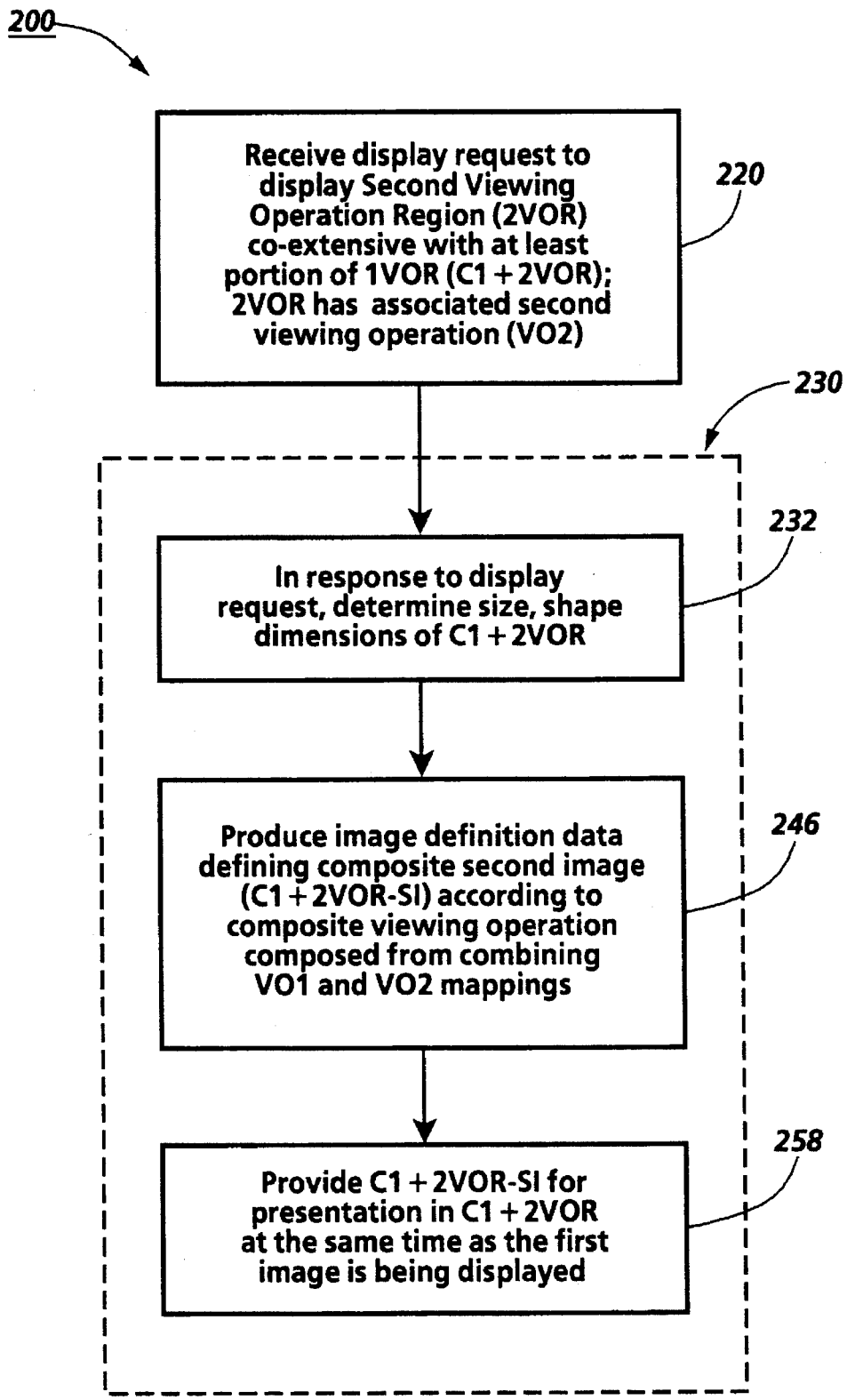
FIG. 1 is a flow chart illustrating the acts of the method of operating a machine according to the present invention.

While the present invention will be hereinafter described in connection with an illustrated embodiment, it will be understood that it is not intended to limit the invention to that embodiment. On the contrary, it is intended to cover all alternatives, modifications and equivalents as may be included within the scope of the invention as defined by the appended claims.

DETAILED DESCRIPTION OF THE ILLUSTRATED EMBODIMENTS

TABLE 2

| Detailed Description Table of Contents |
|---|
| A. Definitions and Machine Environments. |
|    1. Definitions. |
|    2. The first image model data structure. |
|       a. Model data structure sources. |
|       b. Object-based model data structures. |
|    3. The machine environment. |
| B. Description of the Method of the Present Invention. |
|    1. The initial contents of the display area include a first viewing operation region and a second image displayed therein, showing information about the first image model data structure. |
|    2. Producing the composite second image for display in the composite viewing operation region. |
|    3. Producing non-composite images for display. |
|    4. Composing viewing operation regions using a second model data structure. |
|    5. Additional illustrated examples. |

TABLE 2-continued

Detailed Description Table of Contents a. Operating on an object-based model data structure.
  b. Additional considerations involved in determining the size and shape dimensions of a composite viewing operation.
 6. A user interface implementation and its system environment.
C. The machine and software product of the present invention.
D. Additional Considerations
 1. Producing composite images with more than two VORs.
 2. Producing composite images using different model types.
 3. Producing composite results using non-visual outputs.

A. Definitions and Machine Environments.

The present invention relates to method steps for operating a machine including a processor, and to processing electrical or other physical signals to produce other desired physical signals. The detailed descriptions which follow are presented largely in terms of display images and symbolic representations of operations of data within the memory of the display system. These descriptions and representations, which are algorithmic in nature, are the techniques used by those skilled in the data processing arts to most effectively convey the substance of their work to others skilled in the art. An algorithm is here, and generally, conceived to be a self consistent sequence of acts leading to a desired result. These acts are those requiring physical manipulations of physical quantities such as electrical or magnetic signals that are capable of being stored, transferred, combined, compared, and otherwise manipulated. It proves convenient at times, principally for reasons of common usage, to refer to these signals by a variety of terms, including bits, values, elements, pixels, symbols, characters, terms, numbers, items, or the like. However, all of these terms and the additional terms defined below are convenient labels applied to appropriate physical quantities.

Further, the manipulations performed are often referred to in terms, such as adding, comparing, or determining, which are commonly associated with mental operations performed by a human user. The capability of a human user is neither necessary nor desirable in the operations described herein which form part of the present invention. In some aspects of the present invention, however, the machine operations are performed in response to operation request signals produced by a human user. In addition, the algorithmic descriptions presented herein of the acts of the present invention for operating a display system are not inherently related to any particular processor, machine, or other apparatus. Useful machines for performing the operations of the present invention include general purpose digital computers or other similar devices configured as described below and in the claims.

The present invention also relates to a machine for performing these operations. This machine may be specially constructed for the required purposes or it may comprise a general purpose computer selectively activated or reconfigured by a computer program stored in the computer. In particular, various general purpose machines may be used with programs in accordance with the teachings herein, or it may prove more convenient to construct more specialized apparatus to perform the required acts of the method. The required structure for a variety of these machines will appear from the description given below.

1. Definitions.

Preliminary to describing the embodiments of the claimed invention illustrated in the accompanying drawings, the terms defined below have the meanings indicated throughout this specification and in the claims.

The term "data" refers herein to physical signals that indicate or include information. The term "data" includes data existing in any physical form, and includes data that are transitory or are being stored or transmitted. For example, data could exist as electromagnetic or other transmitted signals or as signals stored in electronic, magnetic, or other form.

An "item of data" or a "data item" is a quantity of data that a processor can access or otherwise operate on as a unit. For example, an eight-bit byte is a data item in many data processing systems. Data can be combined into a "data structure". A "data structure" is any combination of interrelated data. A data structure may also include other data structures.

A "processor-controlled machine" or "processor" is any machine, component or system that can process data, and may include one or more central processing units or other processing components. Any two components of a machine or system are "connected" when there is a combination of circuitry that can transfer data from one of the components to the other. The component from which the data is transferred "provides" the data, and the other component "receives" the data. For example, two processing units are "connected" by any combination of connections between them that permits transfer of data from one of the processing units to the other. A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor "uses" data in performing an operation when the result of the operation depends on the value of the data. An "instruction" is an item of data that a processor can use to determine its own operation. A processor "executes" a set of instructions when it uses the instructions to determine its operations.

"Memory" is any component, combination of components, circuitry, or system that can store data, and may include local and remote memory and input/output devices. An example of memory is a storage medium access device with a data storage medium that it can access.

A "data storage medium" or "storage medium" is a physical medium that can store data. Examples of data storage media include magnetic media such as floppy disks and PCMCIA memory cards, optical media such as CD-ROMs, and semiconductor media such as semiconductor ROMs and RAMs. As used herein, "storage medium" covers one or more distinct units of a medium that together store a body of data. For example, a set of floppy disks storing a single body of data would be a storage medium. A "storage medium access device" is a device with circuitry that can access data on a data storage medium. Examples include floppy disk drives and CD-ROM readers.

An item of data "indicates" a thing, an event, or a characteristic when the item has a value that depends on the existence or occurrence of the thing, event, or characteristic or on a measure of the thing, event, or characteristic. When an item of data can indicate one of a number of possible alternatives, the item of data has one of a number of "values". In addition, a first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. For example, when a first item of data indicates position information of an image display feature in the display area of a display device, and the position information may be used by the processor to obtain a second data item in a data structure, the first item of data indicates the second item of data. In another example, within a data structure, when a first item of data includes a pointer or other information related to the location of a second item of data in the data structure, the first item of data indicates the second item of data.

An "image" is a pattern of light. An image may include characters, words, and text as well as other features such as graphics. An image may be divided into image "segments," each of which is itself an image. A segment of an image may be of any size up to and including the whole image. An "image output device" is a device that can provide output defining an image. A "display" or "display device" is an image output device that provides information in a visible, human viewable form. A display may, for example, include a cathode ray tube; an array of light emitting, reflecting, or absorbing elements; a device or structure that presents marks on paper or another medium; or any other device or structure capable of defining an image in a visible form. To "present an image" on a display is to operate the display so that a viewer can perceive the image. A "display area" is the portion of the display in which an image is presented or the medium which receives an image. A "display system" is a system or machine that processes data and that includes a display and a processor.

Data "defines" an image when the data includes sufficient information to directly produce the image, such as by presenting the image on a display. Data defining an image will also be referred to herein as an "image definition" or "image definition data". For example, a two-dimensional array is an image definition that can define all or any part of an image, with each item of data in the array providing a value indicating the color of a respective location of the image. Each such image location is typically called a "pixel", and the two-dimensional array of data is typically called "image pixel data" or an "image pixel data structure", each item of data in the array providing a value, called a "pixel value", indicating the color of an image location. While image pixel data is the most common type of image definition data, other image definitions, such as vector list data, are intended to be included within the meaning of data defining an image.

The term "display feature" refers to any human perception produced by a display in a processor-controlled machine or display system. A "display object" or "object" is a display feature that is perceptible as a coherent unity. A "shape" is a display object that has a distinguishable outline; for example, a circular display object is a shape. A shape having a bounded area may be called a "region". An image "includes" a display feature or object if presentation of the image can produce perception of the feature or object. Similarly, a display object "includes" a display feature if presentation of the display object can produce perception of the display feature. As used herein, the term "display feature" includes a single display feature and also may include plural display features that together form a pattern of display features in an image. For example, a display feature perceived as a solid black line in an image may be considered a single display feature or a combination of display features including the line's length, color, solidness, orientation in space, and other such perceivable features. In the terminology just presented, therefore, the solid black line may also be considered a display object which includes the display features of blackness and solidness.

A "viewing operation region", also referred to herein as an "output producing region", is a region having an arbitrarily shaped, bounded area. A viewing operation region is also an example of a "workspace". A "workspace" as used herein is a display region within which other display features appear to have respective relative positions, and "presenting" a workspace that includes plural display features produces the human perceptions of the display features in respective positions relative to each other. A window is an example of a workspace.

A common characteristic of processor-controlled machines and display systems operated by the method of the present invention is a mapping between items of data within the system and display features included in images presented by the system. A display feature "represents" a body of data when the display feature can be mapped to one or more items of data in the body of data, or, stated in another way, a display feature "represents" the item or items of data to which it can be mapped. For example, the display object perceived as a solid black line in an image may represent one or more items of data in the model data structure that an operation uses to produce the line's length, color, solidness, orientation in space, and other perceivable features.

The mapping of one or more items of data to a display feature or object is performed by an "operation" which is used herein to mean a set of instructions (instruction data items) accessible and executable by the processor in a display system, defining the mapping relationship or function between one or more items of data (an input of the operation) and a display feature or object in an image (an output of the operation). An operation "produces" a display feature or object in an image when the operation begins without the data defining the display feature or object in the image and performing the operation results in the data defining the display feature or object in the image. When the operation uses items of data as input to produce data defining a display feature or object in an image, the display feature or object is "produced from" those input data items. An operation "modifies" an item of data that has one of a number of values when it changes the data item to a data item that has a different value.

One way of categorizing an operation is to distinguish it by the type of data the operation uses as input. An operation such as an image processing operation uses image definition data defining an original image (for example image pixel data) to produce image definition data defining a "version" of the original image, that is, an image different from the original image. The magnification operation disclosed in U.S. Pat. No. 4,800,379, for example, maps pixel data defining a first image or portion thereof to pixel data defining a second, different image (the magnified image). An operation of this type is an "image-based operation." An image-based operation maps one or more image definition data items, such as pixels, to a display feature included the image produced by the operation.

The method of the present invention is a "model-based operation." The distinction between image-based and model-based operations is important to the invention. A model-based operation uses "model data" as input to produce image definition data defining an image as output. A data item other than image definition data, for example, a data item other than an image pixel data item, is an "information model data item" or "model data". A model-based operation maps one or more model data items in a model data structure to a display feature included in the image produced by the operation.

A combination of interrelated model data items is referred to herein as an "information model data structure", a "model data structure", or a "first image model data structure." For purposes of describing the invention herein, all model data items an operation uses to produce an image are considered to be included as part of the model data structure. Moreover, the model data structure is not limited to a combination of data items physically located in a substantially contiguous part of a system's memory, but may include individual model data items diversely located in memory and accessible by the processor when it performs the operation. In addition, the interaction between the model data and the operation, and the nature, quantity and source of the data considered to be part of the model data structure, vary according to the functional capability of the model-based operation, which may itself vary considerably.

2. The First Image Model Data Structure.

a. Model data structure sources.

Figure 27:
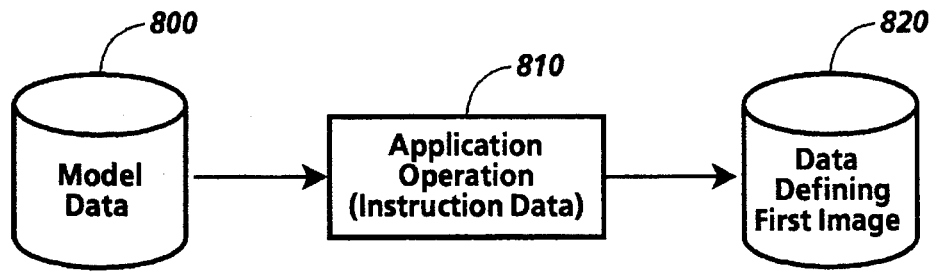
FIGS. 27, 28, and 29 illustrate examples of sources of the model data in the first image model data structure from which the first image may be produced, and on which the method of the present invention operates.
Figure 28:
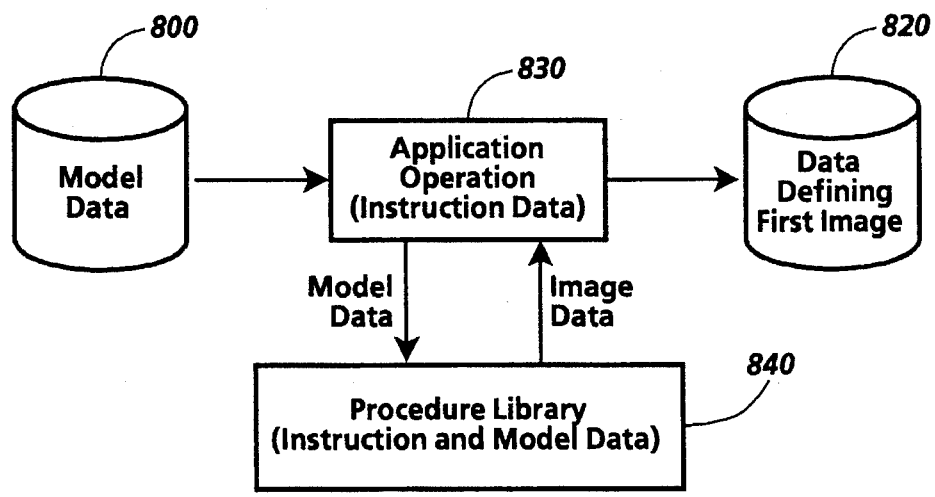
Figure 29:
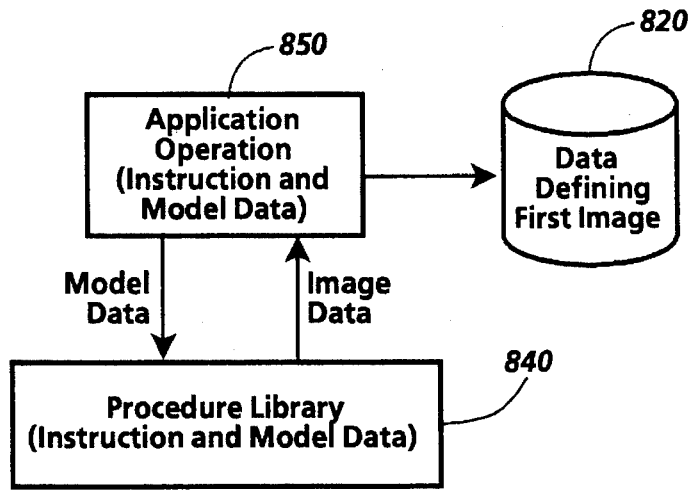

The method of the present invention "operates on" an image when it uses the model data structure from which the image was produced to produce image definition data defining a second image. The model-based operation that produced the first, or original, image in the description of the invention that follows will be referred to as an "application". FIGS. 27, 28, and 29 illustrate examples of the source of the model data used by the application, its interaction with the application, and the variability of the functionality of the application which produces what is referred to below as the first image. Variations of the examples illustrated in FIGS. 27, 28, and 29 as they relate to the source of the model data and its interaction with the application are also possible, and are intended to be encompassed in the discussion of the illustrated embodiments of the present invention.

Figure 30:
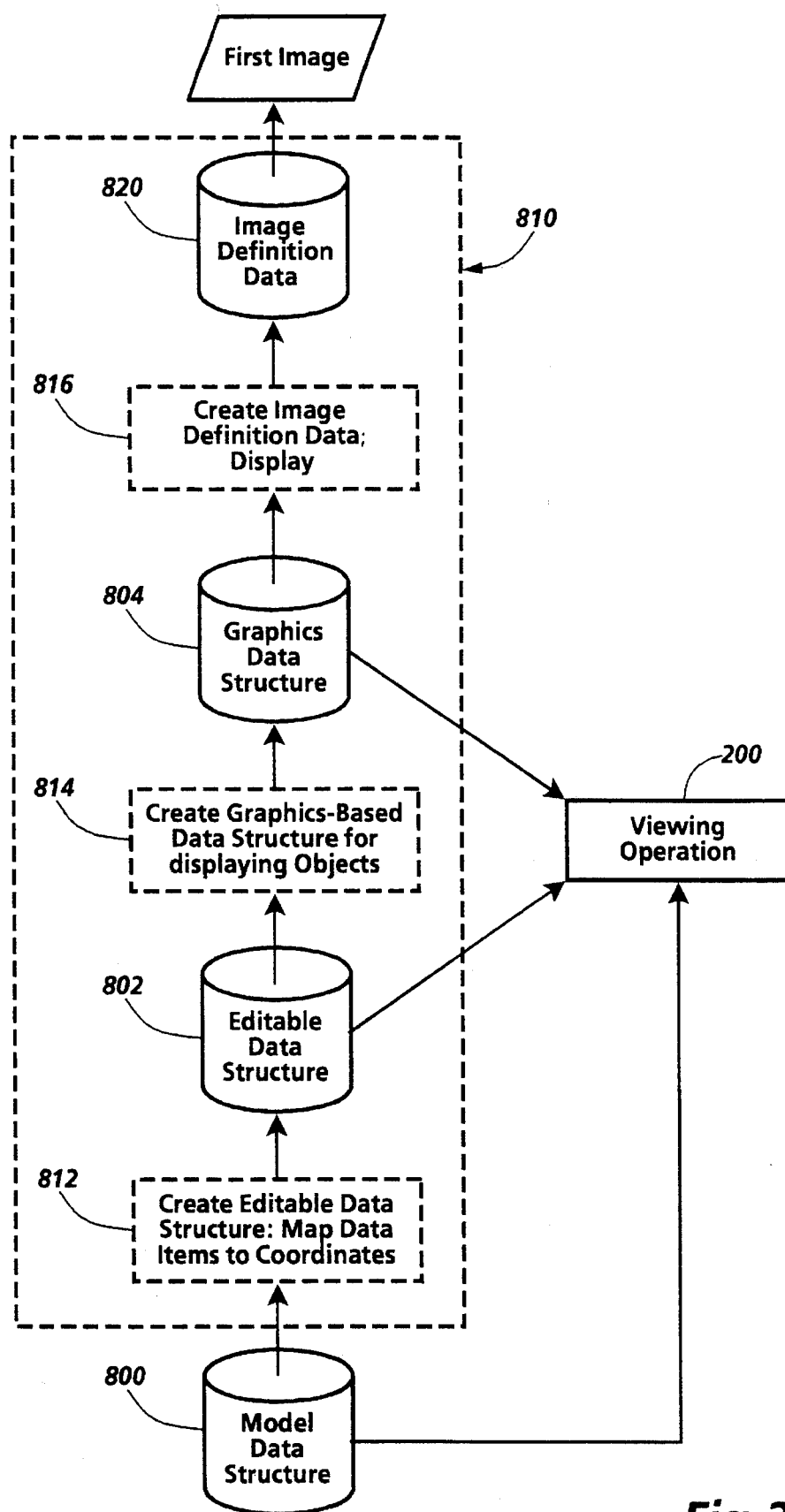
FIG. 30 illustrates types of model data structures on which the method of the present invention may operate.

In FIG. 27, model data structure 800 contains data items including sufficient information to permit the application 810 to entirely produce image data 820 defining the image. So, for example, if the image defined by image definition data structure 820 includes a display object perceived as a solid black line, the solid black line represents one or more data items in model data 800 indicating the existence, position, and orientation of the line in the image, and having values of the "blackness" and "solidness" of the line. Thus, according to the terminology defined herein above, all of those model data items in model data 800 used to produce the solid black line are part of the "model data structure" as that term is intended to be used herein, and the solid black line can be said to represent those model data items. A page description data file, described in more detail in the discussion below accompanying FIG. 30, is an example of model data 800 in FIG. 27.

Or, as shown in FIG. 28, application 830 may make use of components of instruction data that perform the common and basic functions used to produce an image. These components, commonly called procedures or subroutines, may be stored in a separate memory location called a procedure library 840. The procedures themselves may include model data items. So, for example, for the same image defined by image definition data structure 820 that includes the solid black line, the solid black line represents one or more data items in model data 800 indicating the existence of the line in the image, and also represents one or more data items in procedure library 840 indicating the position and orientation of the line in the image, and having values of the "blackness" and "solidness" of the line. Thus, the display object of the solid black line can be mapped to data items in model data 800 and in procedure library 840. According to the terminology defined herein above, all of those model data items in model data 800 and in procedure library 840 used to produce the solid black line are part of the "model data structure", and the solid black line can be said to represent those model data items.

Finally, as shown in FIG. 29, application 850 may make use of procedures in procedure library 840, and may also include model data items within its own set of instruction data, such as parameter values, lists, tables and arrays, that are used to produce image definition data structure 820. For the same image defined by image definition data structure 820 that includes the solid black line, the solid black line represents one or more data items in application 850 indicating, for example, the existence of the line in the image and having values of the "blackness" and "solidness" of the line, and also represents one or more data items in procedure library 840 indicating the position and orientation of the line in the image. Again, all of those model data items used to produce the solid black line are part of the model data structure, and the solid black line represents those model data items.

For ease of reference in the remainder of the specification, a reference to the first image model data structure, which the application uses to produce the first image and on which the method of the present invention operates, is intended to include all of the model data items used to produce the first image in any of the configurations illustrated in FIGS. 27, 28, and 29.

Any one of the applications 810, 830, and 850 illustrated in FIGS. 27, 28, and 29, respectively, may create intermediate model data structures while executing instructions for operating on model data before creating the image definition data 820 defining the image. These intermediate model data structures may be stored in the memory of the machine after the application is complete, and therefore may be accessible to the method of the present invention, or they may be accessible during the application's execution. It is intended that the method of the present invention operate on any of these intermediate model data structures from which the original image may be ultimately produced.

Examples of such intermediate model data structures are illustrated in FIG. 30, in which application 810 is a representative graphical object editing application. Application 810 is composed of processes 812, 814, and 816; processes 812 and 814 produce intermediate data structures 802 and 804. For example, intermediate data structure 804 may be a display list of objects in a graphical image, or it may be a page description file containing instructions in a high-level page description language (PDL), also called a graphics language, describing the device independent appearance of text, graphical shapes, and sampled images on printed pages. Process 816 is then a display list processor or PDL interpreter producing image definition data 820 from which image 180 is directly produced. The method of the present invention, designated as a "viewing operation" 200 in FIG. 30, may operate on any of data structures 800, 802, or 804.

Additionally, the model data structure may also include other data items that are not directly used by the application to produce the image but which may be known to and accessible by the application or another model-based operation. In addition, the model data structure may include a data item which, while used to produce the image, also indicates one or more other data items which are not used to produce the image and which are not included in the model data structure. For example, a data item in the model data structure represented by a display object in the image may also indicate a second model data item having characteristic or detail information about the display object that is not represented in the image. This second model data item may be included in the model data structure, or may be included in a different data structure linked to the model data structure. For example, in a model data structure that an application uses to produce a spreadsheet image, a data item having a value indicating a numerical entry in one of the columns may also indicate another data item containing the values indicating the individual numbers totaling the numerical entry in the spreadsheet, or the equation used by the spreadsheet cell to compute its numerical value.

b. Object-based model data structures.

A model data structure from which an image can be produced may be composed of a collection of data items describing "objects". An "object" represents a semantic aspect of an application domain (e.g., letters, words, and paragraphs in a word processor; strokes in a drawing system; temporal events and dependencies in a project management system; etc.). Typically, an "object description data item" in the data structure is itself composed of other data items that describe a set of properties of the object. For a particular object, the properties may represent positional and visual attributes of the object that determine how the object will be perceived when displayed, in addition to application-specific attributes used by the application that produced the image. Typically also, each object, along with its properties, is uniquely addressable by a pointer or identifier, and thus objects can refer to each other in their descriptions. Objects or their properties may also describe relations or constraints between other objects. The term "display feature attribute data item" when used in reference to a data item in an object-based model data structure will refer to an object property.

Because the model data structure is organized around object description data items, new objects can be added to the model data structure, to be presented for display at a particular spatial location when the image is produced; an object can be deleted from the model data structure, and therefore from the image produced; and an object can have any one of its properties changed by arbitrary computations. The image produced from such a model data structure may show an object overlapping spatially with another object. For model data structures operated on by an application which presents an editable image, an object can be moved to a new position in space, and the model data structure changed accordingly to have information correctly indicating the new position. Where an application provides for receiving input for performing editing operations, a user may manipulate objects in an image, and the user's input signals, converted to display position information, can be mapped to specific objects in the model data structure in order to allow the user to edit or otherwise manipulate the object-based model data structure.

In one type of object-based model, the object data item descriptions fully describe how objects are to be spatially presented with respect to each other in an image. Such an object-based model data structure is rendered into either a graphics or procedural model data structure, such as the PostScript® page description language, or directly into an image definition data structure (such as a pixel array) in order to guide the display hardware and software to display the objects on the display. PostScript® is a trademark of Adobe Systems.

Other types of object-based models do not include data that fully describe how objects are to be spatially presented with respect to each other in an image, and an application that operates on such object-based models must include instructions for laying out the objects in an image. Typically, the application uses some form of object identification data in the model to determine where an object is to be positioned in the image, effectively linking the object to its position. The method of the present invention is intended to operate on models of this type as well. When explicit object position data in the model is not available to link a displayed object in an original image to an object data item in the model that produced the image, the method of the present invention only requires that object identification data linking the object to its position in the original image be available. Such information is typically available from the application.

Figure 31:
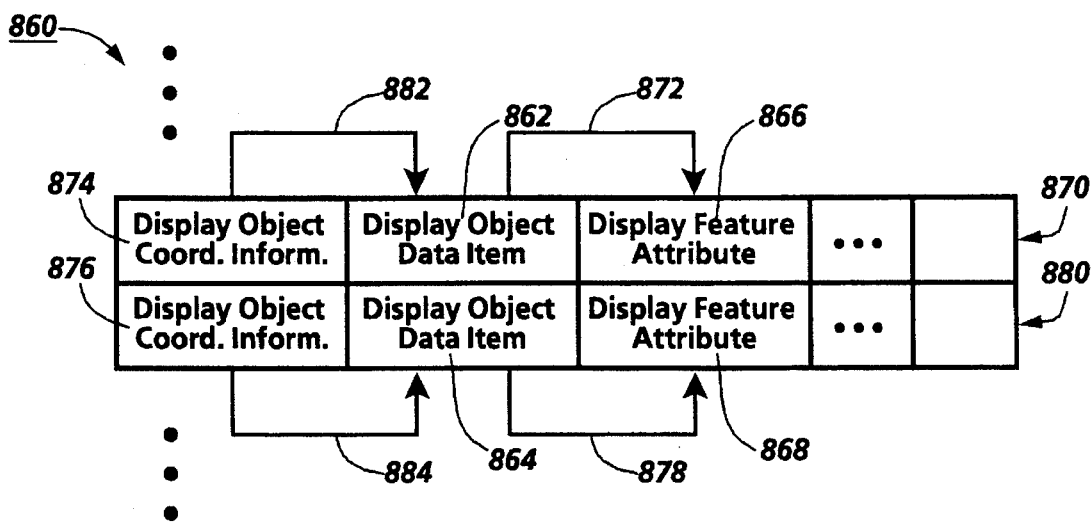
FIG. 31 illustrates the data structure organization of an object-based model data structure on which the method of the present invention may operate.

FIG. 31 illustrates an example of the data structure organization of an object-based model data structure 860 of the type used by the method of the present invention. Object description data items 870 and 880, respectively, each include a collection of data items represented by a display object in an image. Object data items 862 and 864 include information identifying the display objects, and "indicate" or display feature attribute data items 866 and 868 respectively, which contain information about object properties. Each display feature attribute data item has a present attribute value indicating a display feature of the display object when displayed in the display area. For example, display feature attribute data items 866 and 868 could have values for fill colors, outline colors or other visible features of the display objects. Connecting lines and arrows 872 and 878 illustrate the concept that object data items 862 and 864 indicate display feature attribute data items data items 866 and 868 respectively. The connection between the data items may be implemented using pointers or other linking mechanisms, or by defining the data structure of object description data items 870 and 880 in memory to the method, or in any other manner that accomplishes this connection. First image model data structure 860 also includes object coordinate data items 874 and 876 indicating display object coordinate information about a present object position of the display objects in the image. As shown by connecting lines and arrows 882 and 884, object coordinate data items 874 and 876 indicate object data items 862 and 864. Thus, if the position in the image of the display objects representing object description data items 870 and 880 can be determined, display feature attribute data items 866 and 868 can be obtained from first image model data structure 860.

3. The machine environment.

Figure 32:
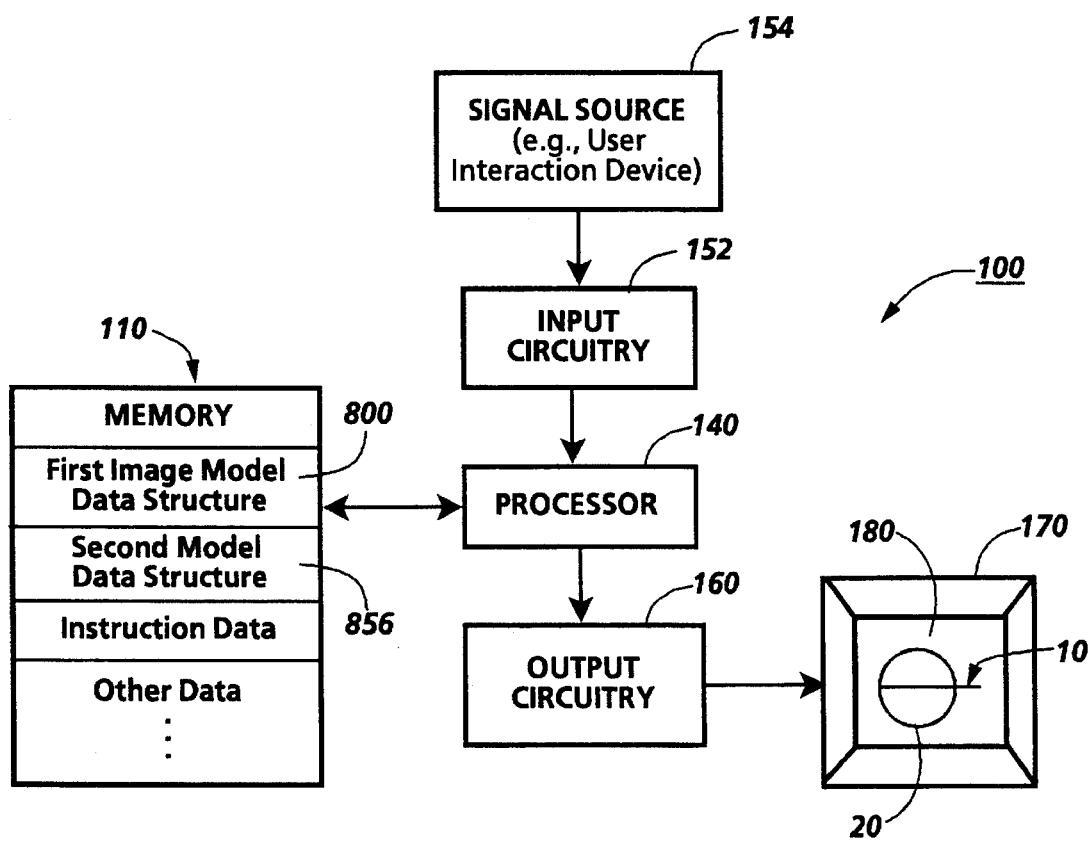
FIG. 32 illustrates a processor controlled machine which the method of the present invention may operate.

The method of the present invention operates a variety of processor-controlled machines, each of which has the common components, characteristics, and configuration of machine 100 illustrated in FIG. 32. Machine 100 includes input circuitry 152 for receiving input "request" signals from one or more signal sources 154 indicating image display requests. Signal source 154 may include any signal producing source that produces signals of the type needed by the method of the present invention. Such sources include a variety of input devices controllable by a human user that produce signals generated by the user, and may also include other devices connected to machine 100 for providing such signals, including devices connected by wired or wireless communications facilities, such as through remote or local communications networks and infrared and radio connections. Signal source 154 may also include operations performed by machine 100, such as the operating system of a digital computer, or other applications performed by the digital computer.

Input circuitry 152 may also be connected to receive signals from one or more signal sources or input devices, such as a user interaction device, that provide signals based on actions of a machine user indicating operation of the input device. Signals from signal source 154 may include a "request" for an operation and information identifying the requested operation, wherein the signal or signals indicate one or more actions by a machine user intended to cause performance of the operation. An operation is performed by the machine "in response" to a request when the signals received are for indicating a valid request for a valid operation and for causing the operation to be performed. Signals indicating a single complete request may include a combination of any number of actions indicated by the user necessary for indicating a valid request for a valid operation and for causing the operation to be performed.

Signal source 154, connected to input circuitry 152, may include, for example, a keyboard or a pointing device, used by the machine user to indicate actions. Suitable pointing devices include, but are not limited to, a mouse, a stylus or pen, and a trackball. The pointing device has circuitry (not shown) for controlling the interaction between the machine user and display features and objects presented on display device 170. For example, the pointing device may have buttons (not shown) which when clicked or released result in signals being sent through input circuitry 152. In addition, signal source 154 may be a pen-like or stylus device that can be moved over the display surface display area 180. In the case of a pen-like or stylus device, there may be a pressure sensitive tip switch (not shown) which results in signals being sent through input circuitry 152 when the user presses the tip switch against display area 180, such as, for example, when the system user uses the stylus to make gestures in display area 180. Alternatively, signal source 154 may be a touch sensitive surface of display device 170, for example corresponding with display area 180, such that input circuitry 152 is included within display device 170. The method of the present invention may be implemented in a manner to receive signals indicating a display request from any of these signal sources. Processor 140 is connected for receiving the signals from input circuitry 152.

Signals indicating user actions may include signals indicating the selection or movement of a display object visible to the user in display area 180, signals indicating requests that result in operations being performed by processor 140, and signals that result in processor 140 providing data defining an image to output circuitry 160 for display in display area 180.

With continued reference to FIG. 32, machine 100 also includes memory 110 for storing data. Processor 140 is connected for accessing the data stored in memory 110, and for providing data for storing in memory 110. Memory 110 stores instruction data indicating instructions the processor executes, including the instruction data indicating instructions for operating machine 100 according to the method of of the present invention.

Processor 140 is also connected for providing data defining the first image 182 to output circuitry 160 for presentation on display device 170 in display area 180. As used herein, with respect to all circuitry components, any two components of circuitry are "connected" when there is a combination of circuitry that can transfer data from one of the components to the other. Processor 140 is further connected for providing data defining images, produced according to the method of the present invention, to output circuitry 160 for presentation on display 170 in display area 180.

The actual manner in which the physical hardware components of machine 100 is connected may vary, and may include hardwired physical connections between some or all of the components, connections over wired or wireless communications facilities, such as through remote or local communications networks and infrared and radio connections. For example, memory 110 may include memory that is physically connected to processor 140 as local memory, or that is remotely accessible to processor 140 by means of a wired or wireless communications facility. Thus, when it is described below that the method causes processor 140 to access a particular data item, that data item may be stored in a memory device that is remotely located from machine 100 but which is accessible to processor 140 by means of the appropriate connections. It is further of importance to note that the range of the physical size of either machine 100 may vary considerably from a machine that includes a very large display device 170 suitable, for example, for electronic whiteboard applications, to a machine that includes much smaller desktop, laptop, and pocket-sized or smaller display devices. It is intended that the method of operating a machine according to the present invention be operable on all display machines in this physical size range.

B. Description of the method of the present invention.

1. The initial contents of the display area include a first viewing operation region and a second image displayed therein, showing information about the first image model data structure.

As shown by example in FIG. 32, the method of the present invention operates machine 100 when display 170 has a first image 10 displayed in display area 180. The first image is produced using a first image model data structure 800 which is also stored in memory 110. There is further displayed in display area 180 a first viewing operation region 20 with a second image displayed therein.

Figure 2:
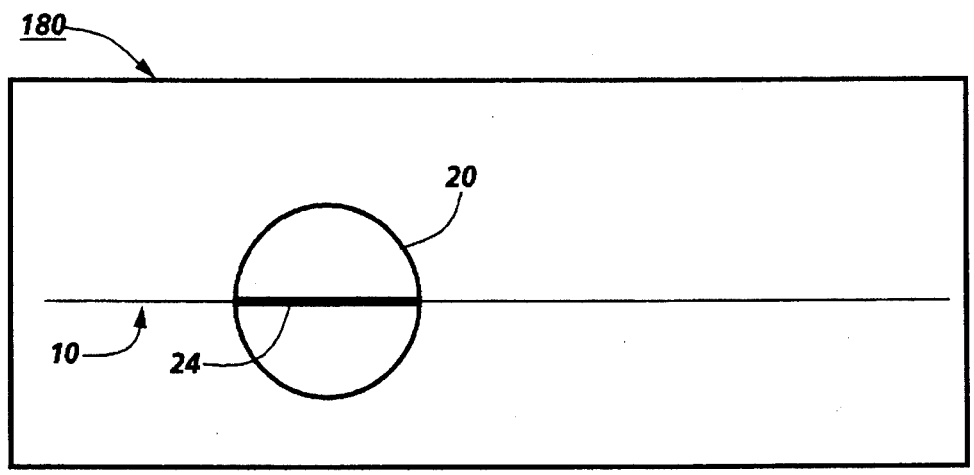
FIG. 2 illustrates a display screen showing the initial contents of the display area on which the method illustrated in FIG. 1 operates.

The initial contents of display area 180 are shown more clearly in FIG. 2. Note that abbreviations used in this description and in the figures are the same as those identified in Table 1 above. Image 10 is a simple black line having a thickness characteristic, or display feature, and having the display feature of being a solid line. Image 10 was produced using a first image model data structure stored in the memory 110 of the processor-controlled machine. A first viewing operation region 20 (1VOR) in a first viewing position in display area 180 is displayed coextensively with the present image position of a first image segment of first image 10. The first image segment includes a portion of the black line of image 10.

As described in more detail in the copending, concurrently filed patent applications listed above, 1VOR 20 has a first viewing operation (VO1) associated with it for providing a second image 24 for display in the 1VOR 20 (1VOR-SI) according to a mapping, or function, of an input model data structure, typically the first image model data structure, to the 1VOR-SI. Mappings, or functions, may be defined so as to produce a wide variety of second images including, but not limited to, a second image showing a modified display feature of a display feature in the first image segment; a second image showing the deletion of a display object from the first image segment; a second image showing the replacement of a display object in the first image segment with a different display object; a second image showing the addition of a display object to display objects shown in the first image segment; a second image showing a modified view of the first image segment by changing a global parameter controlled by an application; and a second image showing the results of a selection of a display object in the first image segment according to some criteria defined in the VO1 and matched to data in the first image model data structure. In the example illustrated in FIGS. 2–5, VO1 modifies the line thickness of lines in a first image. In the illustrated example, a new attribute value for the display feature attribute data item in the first image model data structure that determines the line thickness is obtained and used in place of the present attribute value so that the 1VOR-SI 24 includes the line having the modified line thickness. 1VOR-SI 24 has size and shape dimensions substantially identical to the size and shape dimension of 1VOR 20 and replaces the first image segment in the display area.

Figure 3:
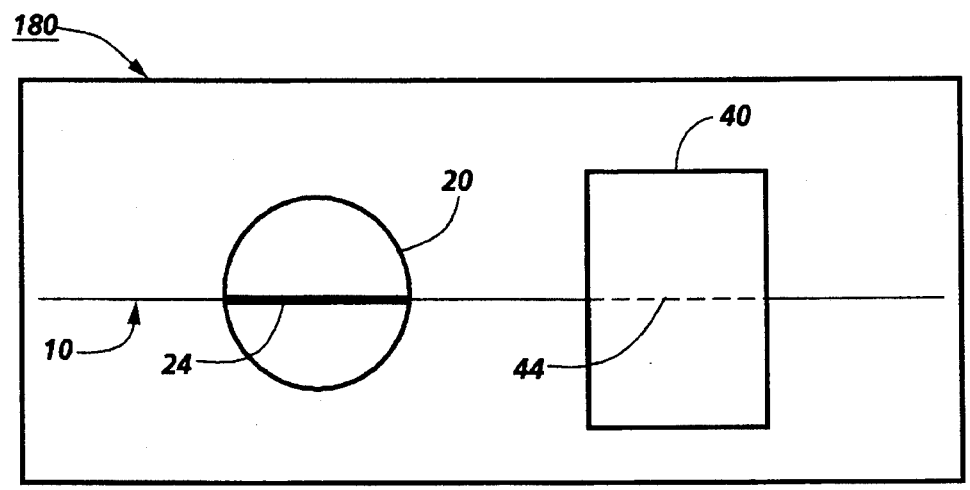
FIGS. 3, 4 and 5 illustrate a sequence of display screens showing a composite image produced according to the method illustrated in FIG. 1.

As also described in the copending, concurrently filed patent applications listed above, multiple views of the same original image may be displayed by using more than one VOR positioned over different parts of the original image. FIG. 3 illustrates a second viewing operation region (2VOR) 40 over a different portion of image 10. Note that 2VOR 40 has a different shape than 1VOR 20; in general, a viewing operation region is a display feature perceptible as a coherent unity having at least one distinguishable outline and at least one bounded area. The distinguishable outline defines and distinguishes the portion, or segment, of the first image for which a second image is produced from the remainder of the first image for which a second image is not produced. In the drawings, the exemplary viewing operation regions are illustrated as bounded areas with an explicitly drawn boundary line. However, the viewing operation region may have a topologically complex boundary, need not be a fixed or predetermined shape, and need not have an explicitly drawn border as long as it is perceptible as a coherent, distinguishable bounded area.

2VOR 40 has a second viewing operation (VO2) associated with it for providing a second image for display in the 2VOR 40 (2VOR-SI) according to a mapping, or function, of an input model data structure, also typically the first image model data structure, to the 2VOR-SI. As with VO1, VO2 may map its input model data structure to one of a wide variety of possible second images. FIG. 3 shows the VO2's mapping of the first image model data structure to the 2VOR-SI when the 2VOR is positioned coextensively with a second image segment of the first image. VO2 changes the "solid" display feature of the black line to that of "broken" to produce a broken black line.

2. Producing the composite second image for display in the composite viewing operation region.

Figure 4:
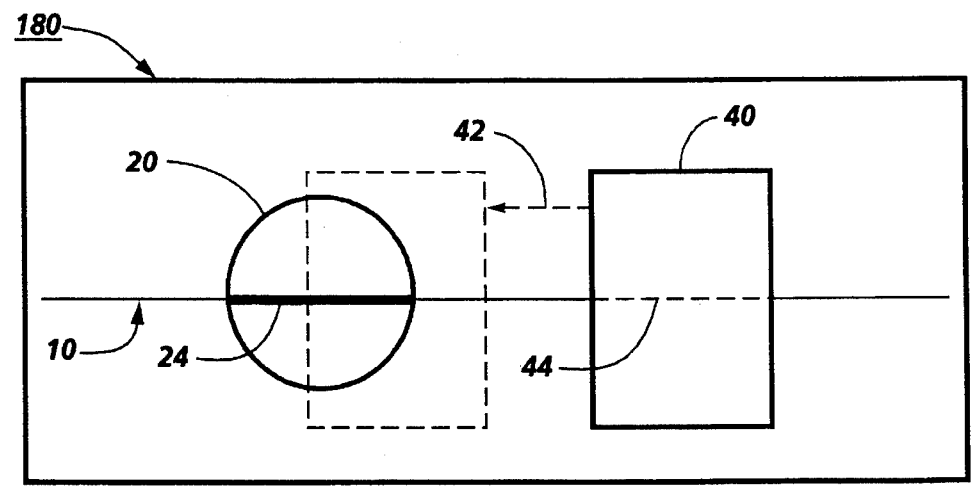
Figure 5:
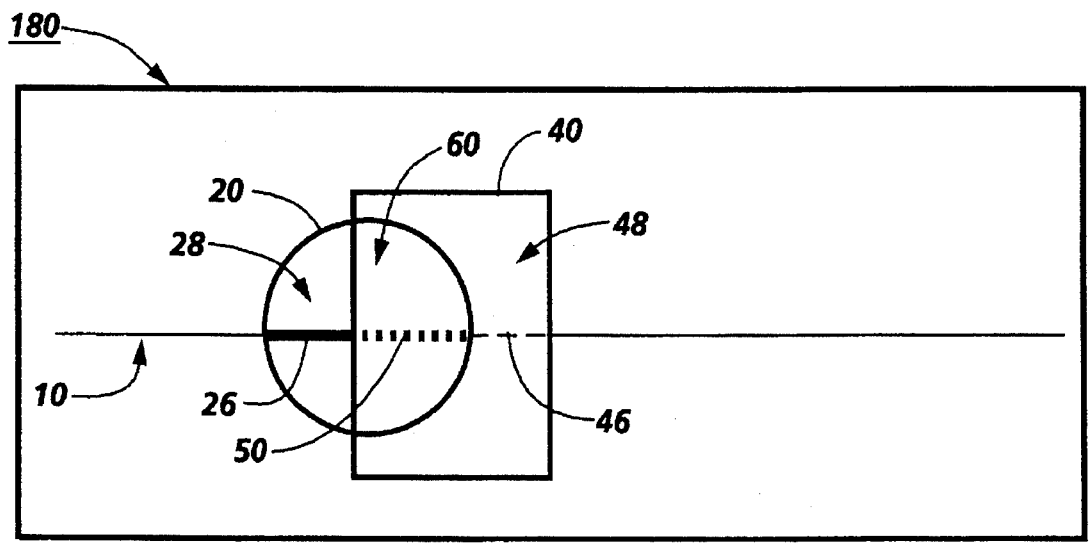

FIG. 1 illustrates the acts of method 200 of the present invention operating on image 10 to produce a composite second image. Display screens 180 in FIGS. 4–5 illustrate the features of the method. A request to display a second viewing operation region 40 (2VOR) in a second viewing position in display area 180 coextensive with the present image position of a second image segment of first image 10 is received, in box 220. The second image segment also includes a portion of the black line of image 10.

Since the method of the present invention has been implemented as a user-directed feature of an application in a graphical user interface environment, the request signal received in box 220 may be a user request signal indicating a movement action on the display of the 2VOR 40 from a first position to the second viewing position in display area 180 coextensive with the present image position of a second image segment of first image 10. FIG. 4 shows in dotted lines the user-directed "movement" of 2VOR 40 along path 42 to a position in display area 180 coextensive with at least a portion of the first viewing position of 1VOR 20. Alternatively, the request signal received in box 220 may be a request that initially or directly generates the 2VOR 40 in the second viewing position coextensively positioned with at least a portion of the first viewing position of 1VOR 20.

In response to the request to display 2VOR 40 in a position in display area 180 coextensive with at least a portion of the first viewing position of 1VOR 20, method 200 causes processor 140 to perform the component acts shown in box 230. First, the size and shape dimensions of the portion of 2VOR 40 that is positioned in display area 180 coextensively with the first viewing position of 1VOR 20 are determined, in box 232, using the viewing positions of each respective viewing operation region. This overlapping region, shown more clearly in FIG. 6, will be called hereafter the composite viewing operation region 60, or C1+2VOR 60. These size and shape dimensions are generally determined through simple manipulation of the geometric outlines of the regions. However, in some instances, the function of the VO2 may also be a factor in determining the size and shape of C1+2VOR 60. This is discussed in more detail below at part B.5.b.

Next, in box 246, image definition data defining a composite second image (C1+2VOR-SI) for display in C1+2VOR 60 is produced using the size and shape dimensions of C1+2VOR 60, and according to a composite viewing operation that maps the first image model data structure to the image definition data defining the composite image. The composite second image has the size and shape dimensions of C1+2VOR 60.

The composite viewing operation is produced by combining the mapping or function defined by the VO1 on its input model data structure with the mapping or function defined by the VO2 on its input model data structure. In the illustrated example, both viewing operation mappings recognize the first image model data structure as a valid input model data structure. How the mappings or functions are combined depends on the particular implementation chosen to accomplish the individual viewing operations, and on the complexity of the individual viewing operations involved.

However, regardless of the specific manner in which the functions are combined, in order to produce a composite image that makes intuitive sense to a machine user of the method, a viewing operation ordering rule must be adopted and adhered to consistently for each composite image produced. That is, whether the mapping of VO1 is performed on the first image model data structure before the mapping of VO2 is performed on its respective input model data structure, or vice versa, must be determined and applied consistently for all composite viewing operations.

Figure 8:
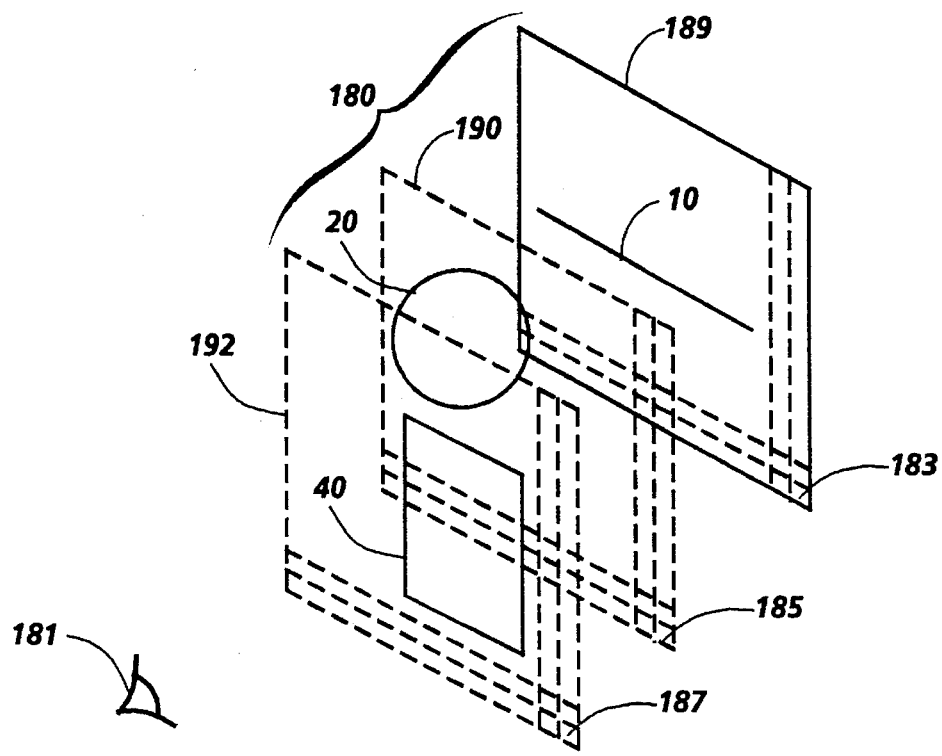
FIG. 8 illustrates the three image planes of the display area implemented in the illustrated embodiment.

The viewing operation ordering rule adopted in the illustrated embodiment is related to the two-and-one-half dimensional ("2.5D") appearance of display area 180, illustrated in FIG. 8, showing display area 180 from the perspective of human user 181 having three image planes 189, 190 and 192. First image 10, 1VOR 20, and 2VOR 40 have the appearance in display area 180 of each being in a different image plane, creating the appearance of a 2.5D image display area 180. Image plane 189 shows first image 10, while image planes 190 and 192 show 1VOR 20 and 2VOR 40 respectively. In the illustrated graphical user interface implementation, in which the user directs the movement of 1VOR 20 and 2VOR 40, the user may move first image 10 in image plane 189 "under" 1VOR 20 in image plane 190, or may move 1VOR 20 in image plane 190 "over" a portion of first image 10 in image plane 189. Similarly, the user may move 1VOR 20 image plane 190 "under" 2VOR 40 in image plane 192, or may move 2VOR 40 in image plane 192

"over" 1VOR 20 in image plane 190. Since each image position 183 in image plane 189 corresponds to an image position 185 in image plane 190 and to an image position 187 in image plane 192, as a result of the user's interaction, 2VOR 40 may be positioned coextensively with a portion of 1VOR 20 and with an image segment of first image 10. The image planes create the appearance of an overlapping order. In the illustrated embodiment, the composite viewing operation is implemented by combining the VO1 and the VO2 in the overlapping order of their respective viewing operation regions in display area 180, beginning with the viewing operation associated with the viewing operation region closest to the image plane containing first image 10. A particular implementation of a composite viewing operation involving the production of a second model data structure is described in detail below.

Then, in box 258, the image definition data defining the composite second image is provided to the output circuitry connected to display 170 so that display 170 presents the composite second image in the C1+2VOR in display area 180 substantially at the same time as the first image is being displayed in display area 180. FIG. 5 illustrates composite image 50 in C1+2VOR 60. VO1, which changes the thickness of the line in image 10 to a thicker line, is combined with VO2, which changes solid lines to broken lines, are combined to produce a broken, thicker line in composite image 50, thus giving the perception to the machine user of showing the results of applying the composite viewing operation to information presented in the first image segment.

3. Producing non-composite images for display.

Figure 6:
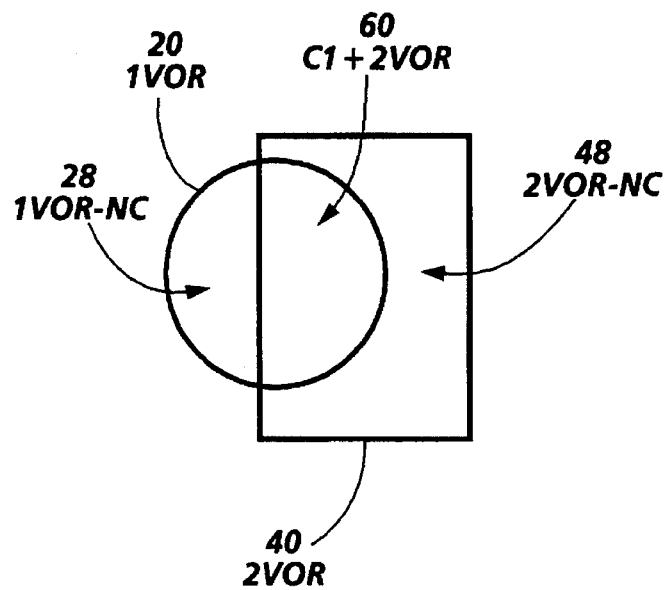
FIG. 6 illustrates the portions of viewing operation regions defined by coextensively positioning two viewing operation regions.

It can also be seen from FIGS. 5 and 6 that, in addition to C1+2VOR 60, other viewing operation regions are created when 1VOR 20 is positioned coextensively with 2VOR 40. The method of the present invention recognizes that a machine user will derive additional benefit from the method when the second images defined by the individual mappings, VO1 and VO2, of the first image model data structures are also produced and displayed in display area 180 in these other regions. In FIG. 6, it can be seen that the portion 28 of 1VOR 20 not positioned coextensively with 2VOR 40, designated as the non-composite portion of 1VOR, or 1VOR-NC 28, is available for showing a portion of 1VOR-SI 24 produced according to VO1, as shown in FIG. 2. Similarly, a portion 48 of 2VOR 40, not positioned coextensively with 1VOR 20 and designated as the non-composite portion of 2VOR, or 2VOR-NC 48, is available for showing a portion of 2VOR-SI 44 produced according to VO2, as shown in FIG. 3. In effect, each of the different regions may be treated as separate viewing operation regions, each with an associated viewing operation.

Figure 7:
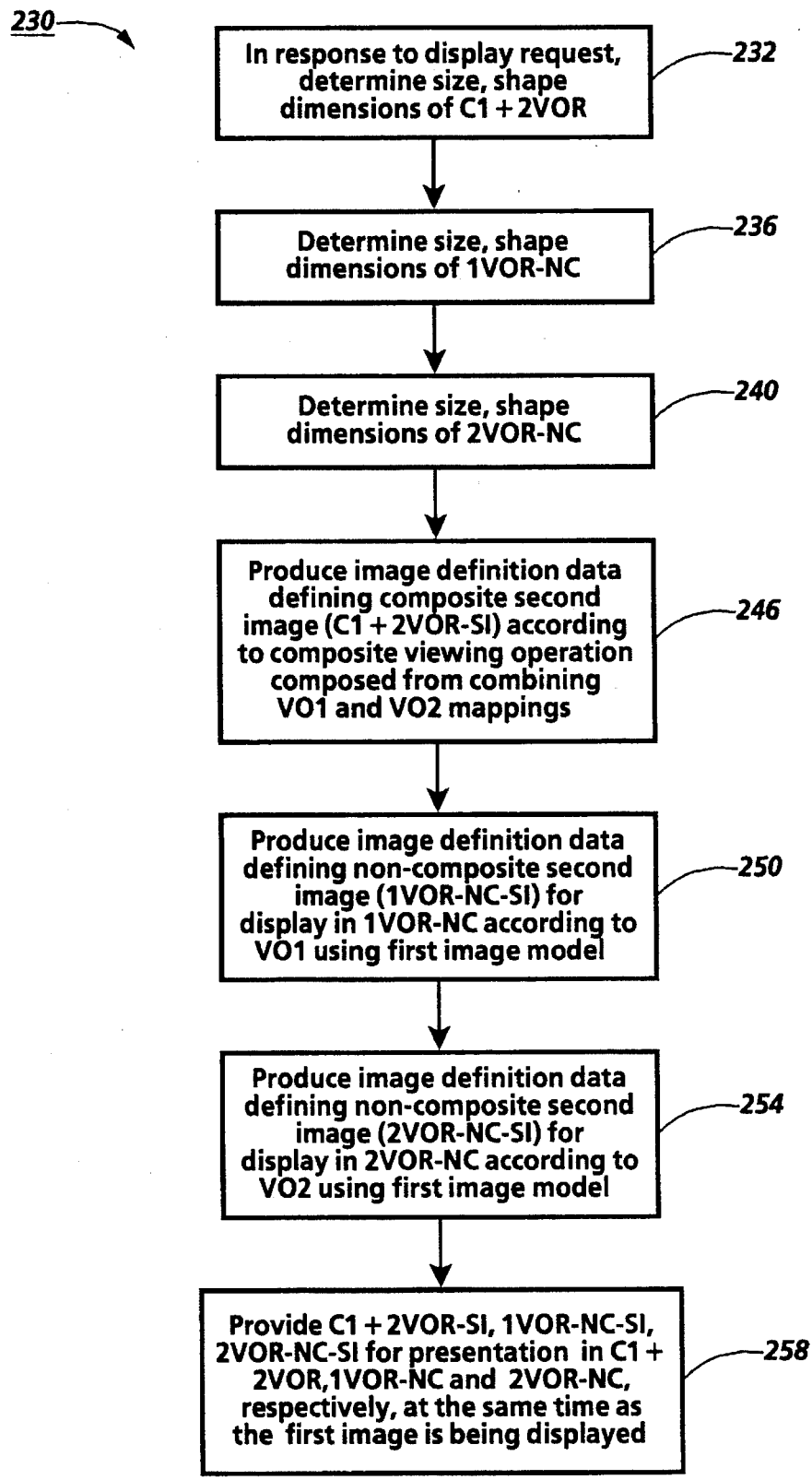
FIG. 7 is a flow chart illustrating the acts of the method of the present invention for producing non-composite second images in the non-composite viewing operation regions illustrated in FIG. 6.

FIG. 7 illustrates additional component acts of the method for producing these additional images in response to receiving the display request signal in box 220. The size and shape dimensions of 1VOR-NC 28 and of 2VOR-NC 48 are determined, in boxes 236 and 240, using the first and second viewing positions of the respective 1VOR 20 and 2VOR 40. Then, in box 250, image definition data defining a second image for display in the 1VOR-NC 28 (1VOR-NC-SI) is produced according to the mapping defined by the VO1 using the first image model data structure and the size and shape dimensions of the 1VOR-NC 28. Next, in box 254, image definition data defining a second image for display in the 2VOR-NC 48 (2VOR-NC-SI) is produced according to the mapping defined by the VO2 using the first image model data structure and the size and shape dimensions of the 2VOR-NC 48. Finally, the image definition data defining the second images for the 1VOR-NC 28, the 2VOR-NC 48, and the C1+2VOR 60 are provided to the output circuitry connected to the display so that the display presents the 1VOR-NC-SI in the 1VOR-NC 28, presents the 2VOR-NC-SI in the 2VOR-NC 48, and presents the composite second image in the C1+2VOR substantially at the same time as the first image is being displayed in the display area. FIG. 5 shows the results of these acts. 1VOR-NC-SI 26 in 1VOR-NC 28 shows the black line of image 10 having increased thickness with the original solid line display feature, while 2VOR-NC-SI 46 in 2VOR-NC 48 shows the black line of image 10 as being a broken line of the original line thickness. Presentation of the 1VOR-NC-SI, the 2VOR-NC-SI, and the composite second image substantially simultaneously thus gives the perception to the machine user of providing multiple views of the first image related to information in the respective image segments coextensive with the viewing positions of the 1VOR-NC, C1+2VOR and 2VOR-NC in the display area.

Figure 9:
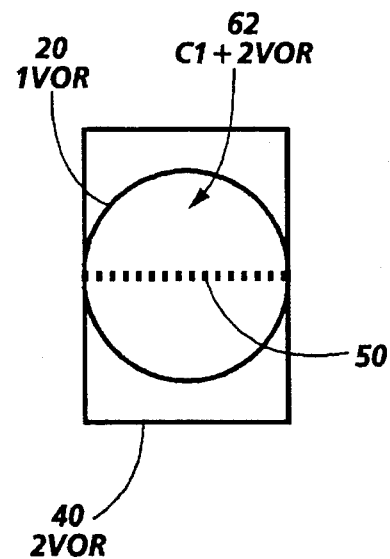
FIG. 9 illustrates the composite viewing operation region defined when the second viewing operation region completely overlaps the first viewing operation region.

It is also possible for the different viewing operation regions to so substantially overlap as to eliminate either 1VOR-NC 28 or 2VOR-NC 48, or both. FIG. 9 illustrates the case where there is no, or substantially no, non-composite viewing operation region for 1VOR 20, and where composite image 50 in C1+2VOR 62 replaces all of the 1VOR-SI in 1VOR 20.

4. Composing viewing operation regions using a second model data structure.

A specific implementation of composing viewing operations involves producing a second model data structure as the output of a viewing operation that is first in the order of composition using the first image model data structure, and then providing that second model data structure as the input to the viewing operation second, or next, in the order of composition. The second model data structure contains the necessary data items from which the second image for the first viewing operation is produced. Thus, applying the second viewing operation to the output data structure of the first viewing operation has the effect of composing the viewing operations and applying the composite operation on the first image model data structure.

Figure 10:
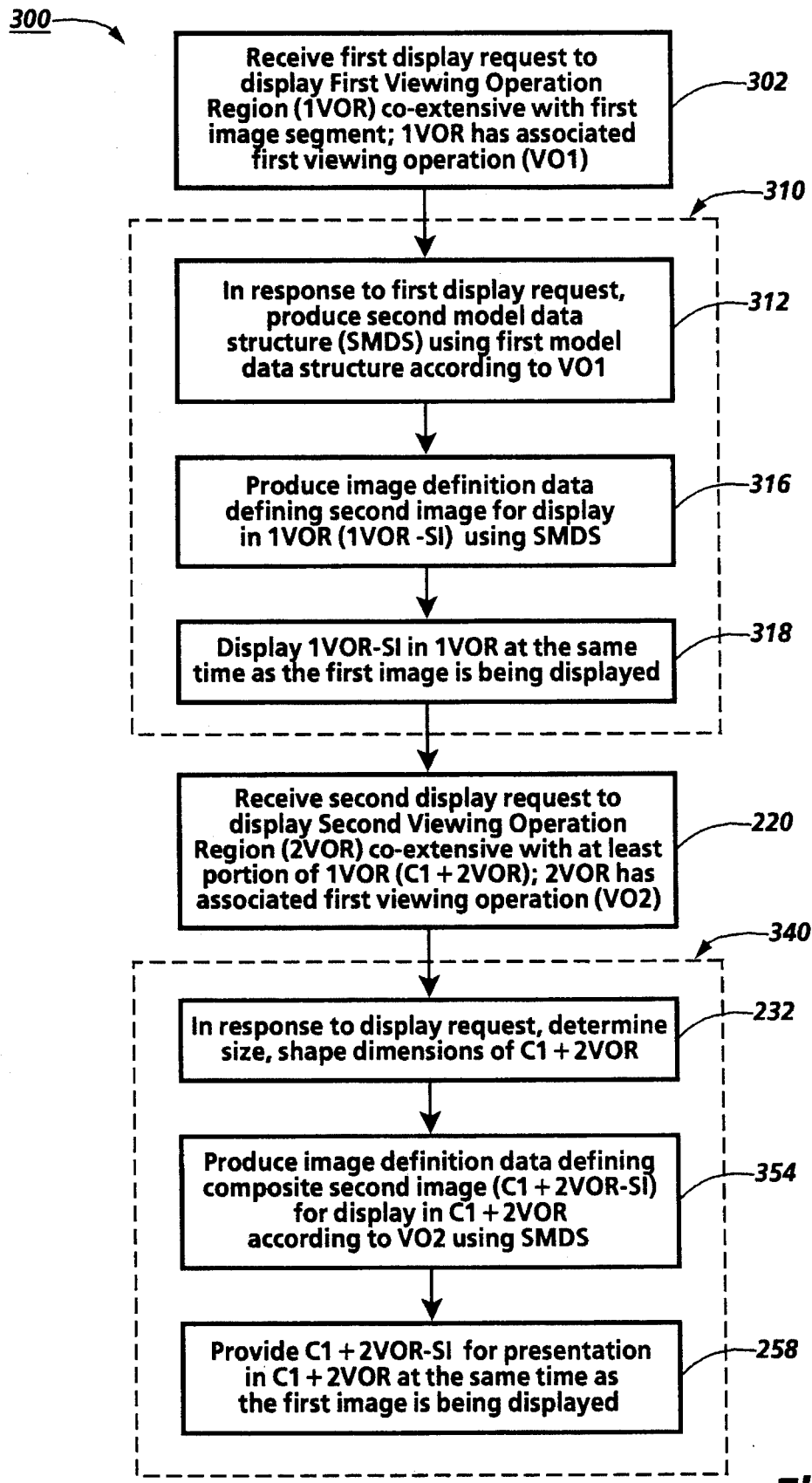
FIG. 10 is a flow chart illustrating the acts of another implementation of the method of the illustrated embodiment.
Figure 11:
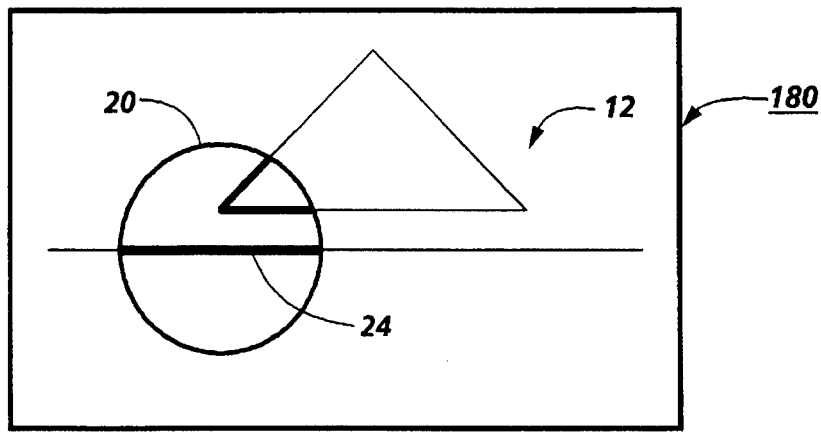
FIG. 11 illustrates a display screen showing the first image and a second image produced according to a first viewing operation for a first viewing operation region.
Figure 12:
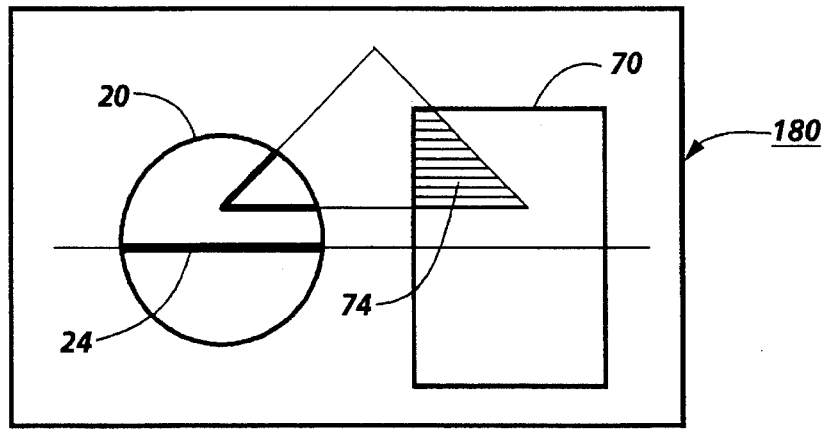
FIG. 12 illustrates a display screen showing the first and second viewing operation regions, each having second images, produced according respective first and second viewing operations.
Figure 13:
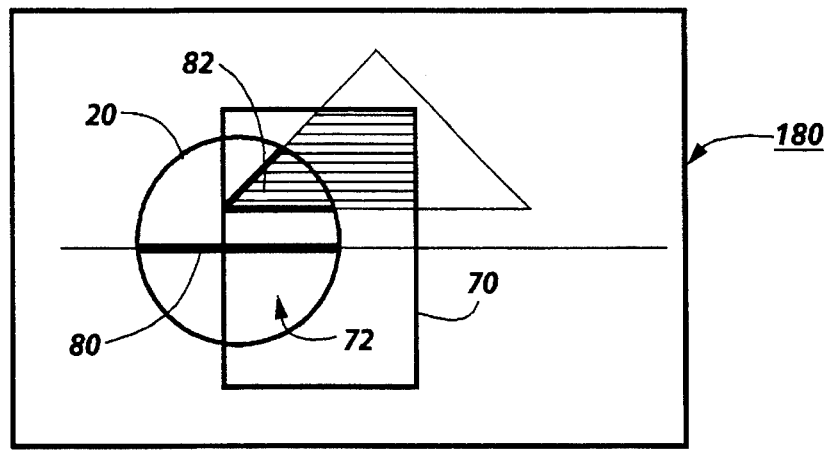
FIG. 13 illustrates a display screen showing the results of composing the first and second viewing operations illustrated in FIGS. 11 and 12 according to the method illustrated in FIG. 10.
Figure 14:
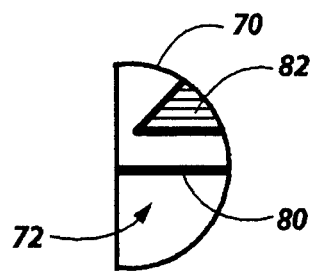
FIG. 14 illustrates the composite second image displayed in the composite viewing operation region shown in FIG. 13.

FIG. 10 illustrates the acts involved in this "model-in model-out" implementation, denoted as method 300. FIGS. 11, 12, and 13 illustrate a series of display screens showing the operation of method 300. A first request signal is received, in box 302, to display first viewing operation region 20 (1VOR) in a first viewing position in display area 180 coextensively with the present image position of a first image segment of first image 12. The first image segment includes a portion of the black line and a portion of the triangle of image 12. 1VOR 20 has a first viewing operation (VO1) associated with it for providing a second image 24 for display in the 1VOR 20 (1VOR-SI) according to a mapping of the first image model data structure to the 1VOR-SI. VO1 is the same viewing operation described earlier, that of changing the thickness of lines in an image. In response to the first display request signal, the component acts in box 310 are performed. A second model data structure is produced, in box 312, according to the VO1 and using the first image model data structure. In the example shown, the first image model data structure, including the display feature data items represented by the lines and the thickness of the lines in image 12, is copied to a second model and the appropriate copied display feature data items are changed to have the new value of an increased thickness. Then, in boxes 316 and 318, image definition data defining the 1VOR-SI 24 is produced from the second model data structure and displayed in 1VOR 20, as shown in FIG. 11.

A second viewing operation region, 2VOR 70 also has a viewing operation (VO2) associated with it for providing a second image for display in the 2VOR 70 (2VOR-SI) according to a mapping of the first image model data structure to the 2VOR-SI. FIG. 12 illustrates the 2VOR-SI in 2VOR 20. The VO2 changes the color of triangular objects in the image to blue, designated by the fill-in pattern shown in FIG. 12 in the portion 74 of the triangle in image 12 that is within the boundary of 2VOR 70.

Producing the composite image is illustrated in boxes 220 and 340, and shown in FIG. 13. A second request signal is received, in box 220, to display 2VOR 70 in a second viewing position in display area 180 coextensively with a portion of the first viewing position of 1VOR 20. In response to the second display request, method 300 causes processor 140 to perform the component acts shown in box 340. First, the size and shape dimensions of the composite viewing operation region 72, or C1+2VOR 72 are determined, in box 232, using the first and second viewing positions of each respective viewing operation region.

Next, in box 354, image definition data defining the composite second image for display in C1+2VOR 72 is produced according to the VO2 using the second model data structure as input to VO2, and using the size and shape dimensions of C1+2VOR 72. In the illustrated example, the VO2 operates on the second model which has data items represented by thicker line segments in 1VOR-SI, and accesses the triangle object data item and its fill-color attribute data item in order to perform the VO2. The resulting composite second image has the size and shape dimensions of C1+2VOR 72. Then, in box 258, as in previously described method 200, the image definition data defining the composite second image is provided to the output circuitry connected to display 170 so that display 170 presents the composite second image in the C1+2VOR 72 in display area 180 substantially at the same time as the first image is being displayed in display area 180. The non-composite images for the first and second non-composite viewing operation regions are produced in the same manner as described above in the discussion accompanying the flow chart of FIG. 7. FIG. 13 illustrates composite image in C1+2VOR 72. VO1, which changes the thickness of lines in image 12, is combined with VO2, which changes the fill-color of triangles, are combined to produce display features 80 and 82, thus giving the perception to the machine user of showing the results of successively applying the individual respective viewing operations, VO1 and VO2, to information presented in the first image segment.

5. Additional embodiments.

A wide variety of composite second images in addition to the illustrated examples herein may be created by composing viewing operations according to the method of the present invention. Two additional examples will be described to illustrate operating on object-based model data structures and to illustrate some additional considerations involved in determining the size and shape dimensions of a composite viewing operation.

a. Operating on an object-based model data structure.

Figure 15:
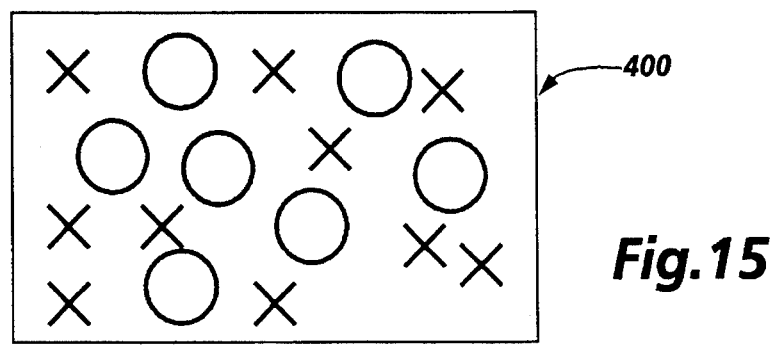
FIG. 15 illustrates a display screen showing another first image to be operated on by an embodiment of the method of the present invention.
Figure 16:
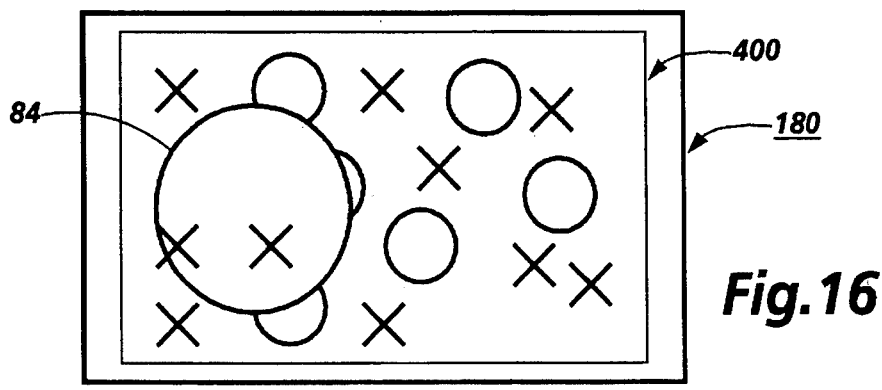
FIG. 16 illustrates a display screen showing the first image of FIG. 15 and a second image produced according to a first viewing operation for a first viewing operation region, according to the method illustrated in FIG. 18.
Figure 17:
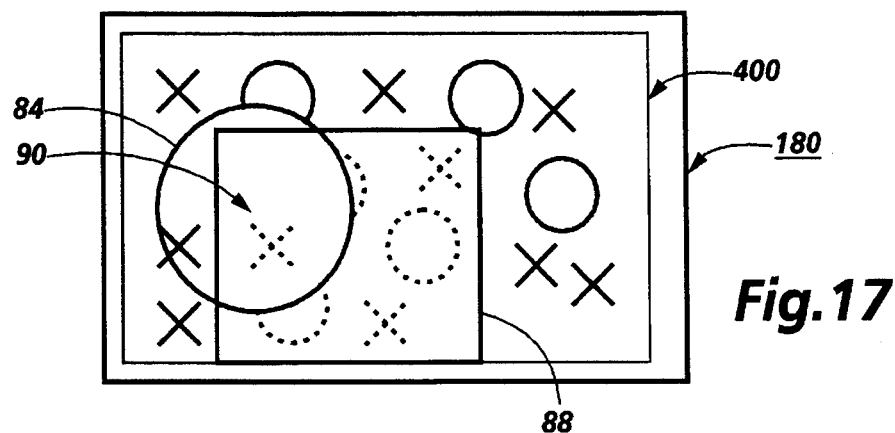
FIG. 17 illustrates a display screen showing the results of composing the first viewing operation illustrated in FIGS. 16 and a second viewing operation according to the method illustrated in FIG. 19.

The model data structure from which the first image was produced in any of the preceding illustrated examples may be organized as an object-based model data structure such as the object-based model illustrated in FIG. 31. FIG. 15 shows an image 400, including display objects in the shapes of figure "o" and figure "x", produced from an object-based model in which the figure "o" and figure "x" display objects represent object data items in the data structure. In FIG. 16, 1VOR 84 has an associated VO1 which is a selection operation, selecting and displaying only figure "x" display objects. The 1VOR-SI shows two selected figure "x" display objects. In FIG. 17, 2VOR 88 has an associated VO2 that changes the solid outline of display objects to a broken outline. The composite image shows the single figure "x" within the boundary of C1+2VOR 90, previously selected by the VO1 and displayed in the 1VOR-SI, having the broken outline provided by the VO2.

Figure 18:
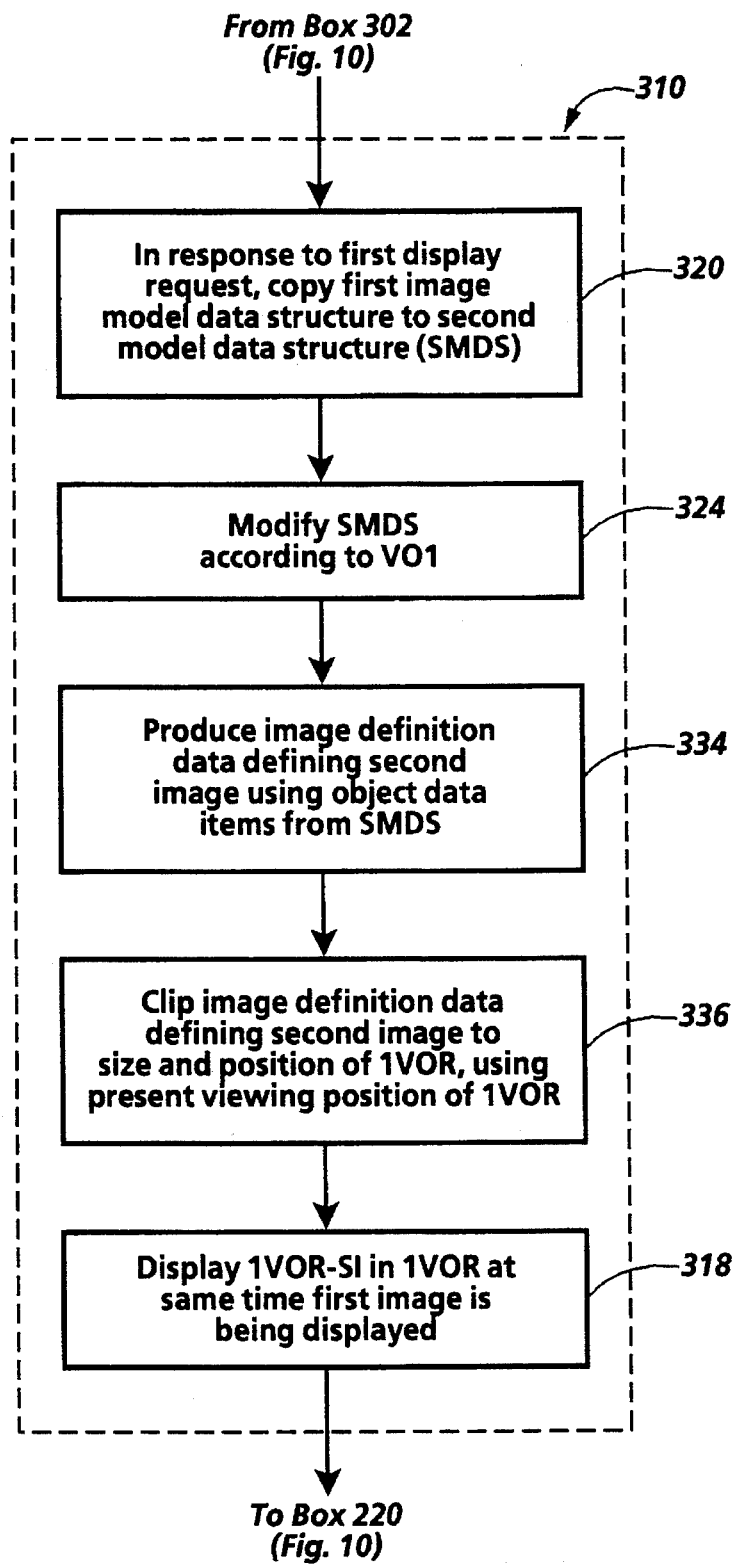
FIG. 18 is a flow chart illustrating the acts for producing the second image displayed in the first viewing operation region illustrated in FIG. 16.

FIGS. 18, 18A, 19 and 19A show the series of steps involved in producing the image definition data defining the composite image and presenting it in the composite viewing operation region, using the modelin, model-out implementation illustrated in FIG. 10. FIG. 18 shows the expanded set of acts in box 310. First, the first image model data structure is copied to a second model data structure, in box 320. Then, in box 324, the specific viewing operation, VO1, associated with 1VOR 84 is performed on the second model data structure, resulting in the modification of the second model data structure according to the VO1.

Figure 18A:
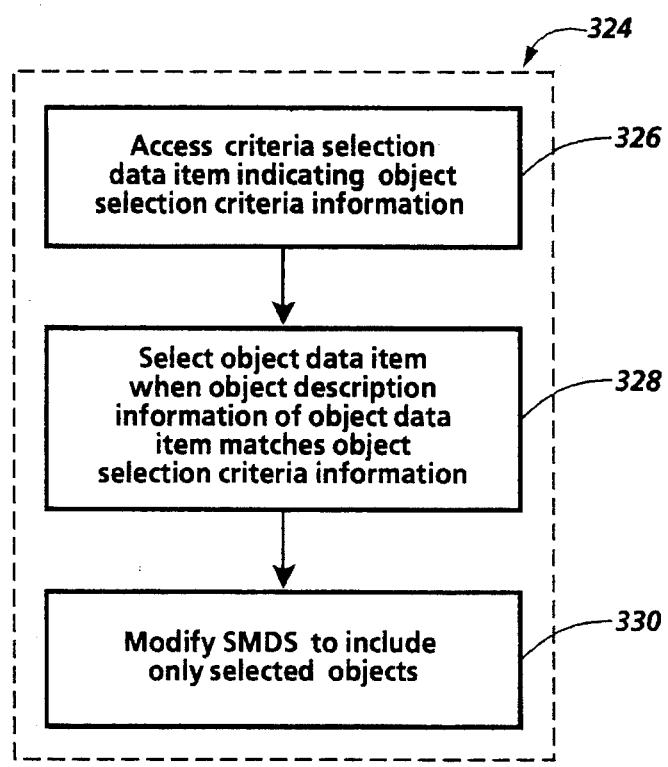
FIG. 18A is a flow chart illustrating the acts for producing a second model data structure according to the first viewing operation associated with the first viewing operation region illustrated in FIG. 16.

FIG. 18A shows the steps in the example illustrated. The VO1, which selects and displays only figure "x" display objects, first accesses a criteria selection data item, in box 326, which identifies the figure "x" display object as the object to be selected from the model data structure. Then, a comparison is made, in box 328, between the object description of each object in the second model data structure and the criteria selection information to determine if the object is a figure "x" display object and thus is to be selected for the second image (1VOR-SI). Then, in box 330, the second model data structure is modified to include only the selected "x" objects. This modification may involve deleting all other objects except the "x" objects from the second model data structure, or specifically identifying or otherwise tagging the "x" objects in the second model as the selected objects.

Returning now to FIG. 18, in box 334, the image definition data defining the 1VOR-SI is produced using the second model data structure as modified according to the VO1, and the resulting second image is clipped to the size and position of 1VOR 84, in box 336, prior to being displayed in 1VOR 84, in box 318.

Figure 19A:
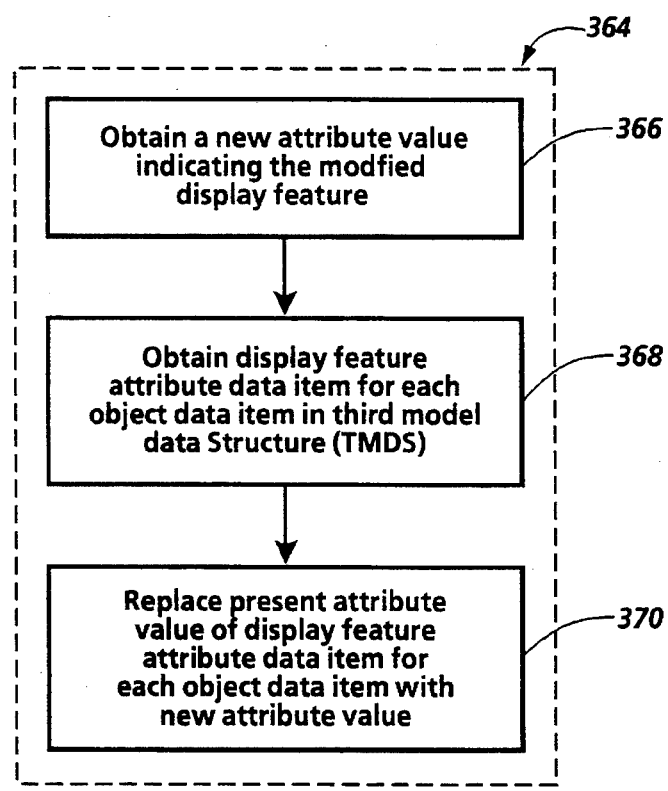
FIG. 19A is a flow chart illustrating the acts for producing a third model data structure according to the second viewing operation associated with the second viewing operation region illustrated in FIG. 17.
Figure 19:
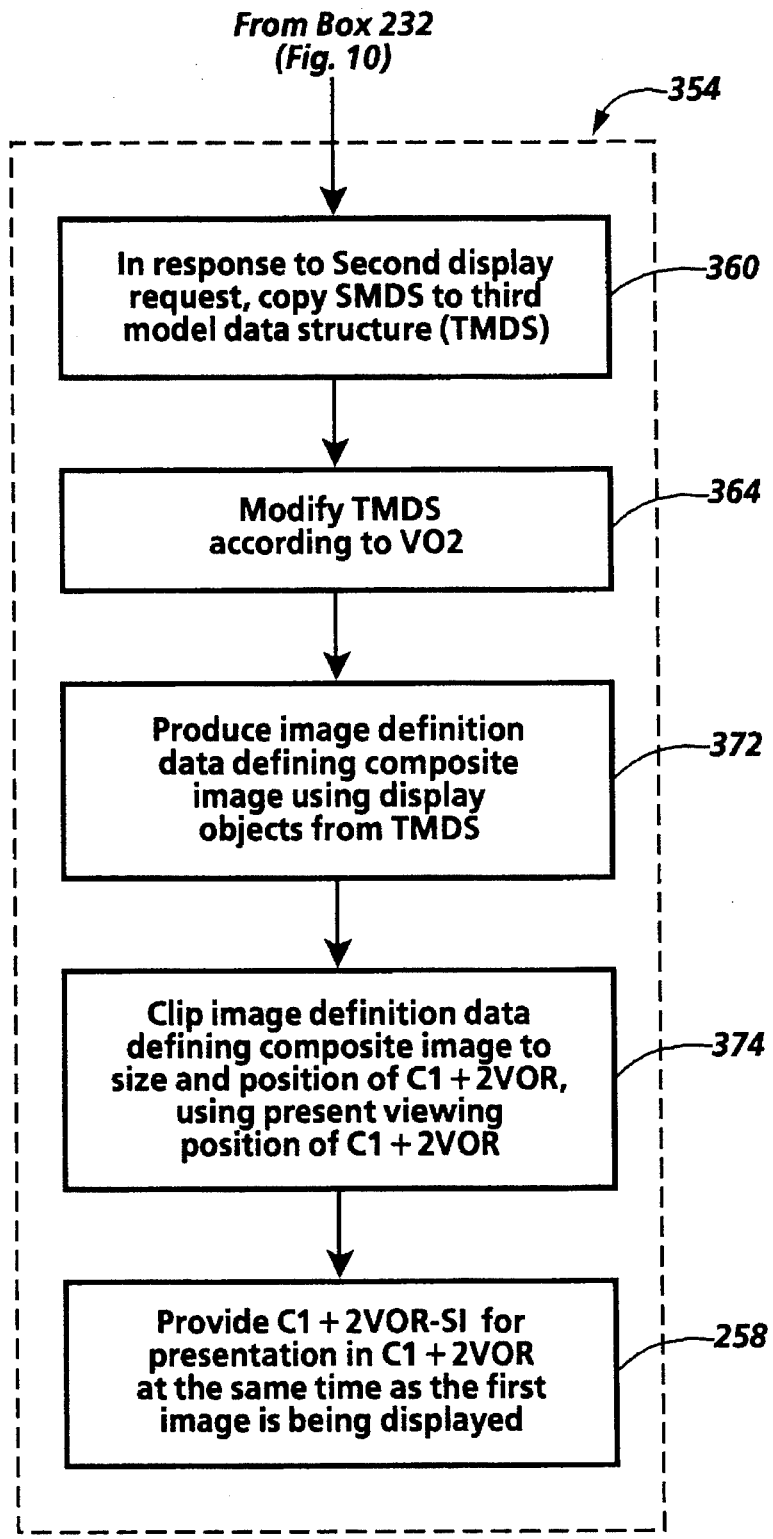
FIG. 19 is a flow chart illustrating the acts for producing the composite second image illustrated in FIG. 17 according to the method of the present invention.

FIG. 19 illustrates the expanded set of acts in box 354 for producing the composite image in the C1+2VOR 90 according to the VO2, which changes the solid outline display feature of the display objects in image 400 to a broken outline. The second model produced by the VO1 becomes input to the VO2 when a 2VOR 88 is positioned coextensively with the first viewing position of 1VOR 84. In order to provide for the composition of any number of viewing operations, each viewing operation in this illustrated "model-in, model-out" embodiment produces an output model data structure resulting from operating on an input model data structure according to the specific requirements of the associated viewing operation. This output model data structure then becomes input to a subsequent viewing operation when another, e.g., third, viewing operation region is positioned coextensively with the viewing position of 2VOR 88. Thus, in FIG. 19, in box 360, the second image model data structure is copied to a third model data structure. Then, in box 364, the specific viewing operation, VO2, associated with 2VOR 88 is performed on the third model data structure, modifying the third model data structure according to the operational requirements of the VO2.

FIG. 19A shows the steps in the example illustrated. The VO2, which changes the solid outline display feature of display objects in image 400 (FIG. 17) to a broken outline, first obtains, in box 366, the new attribute value indicating the "broken line" outline for the display objects. Next, in box 368, each object data item for each display object is obtained from the third model data structure. The object data item, in turn, indicates other data items representing display feature and other properties about the display object. In this example, one of the property data items is a display feature attribute data item indicating the character (e.g., "solidness") of the display object's outline. Thus, in box 368, the display feature attribute data item is obtained for each obtained object data item, and the present attribute value is then replaced by the new attribute value, in box 370.

Returning now to FIG. 19, the image definition data defining the composite image is produced, in box 372, using the object data items from the third model data structure having the new attribute value for each display feature attribute data item, and the resulting composite image is clipped to the size and position of C1+2VOR 90, in box 374. Then the image definition data defining the composite image is provided to the output circuitry for display in C1+2VOR 90, in box 258.

While the content of, and the changes that are made to, the data items in the second and third model data structures as illustrated in FIGS. 18A and 19A are specific to the particular details of the viewing operations involved, the acts in FIGS. 18 and 19 are generally representative of using the model-in, model-out implementation of composing viewing operations that operate on an object-based model data structure.

In the illustrated implementation, each input model data structure that is input to a viewing operation is copied in its entirety, and the modifications required by the viewing operation are made to the entire copied model, regardless of the size and shape of the particular viewing operation region in which the second image will ultimately be displayed. It is possible, for optimization purposes, to operate on only the portion of the model needed to produce the output second image. It is also possible for optimization purposes in the case of the viewing operation associated with the top-most viewing operation region, e.g., the VO2 associated with 2VOR 88, to not copy the input model to produce an output model. In both of these cases, however, there is a risk associated with prematurely clipping the model when the implementation allows for the composition of multiple viewing operations in any reasonable, unlimited composition order. In particular, it is possible that a prematurely clipped model will not provide enough input to a subsequent viewing operation. An example of this is illustrated below in part b.

b. Additional considerations involved in determining the size and shape dimensions of a composite viewing operation.

There will be instances where the function of one or both of the composing viewing operations may also be involved in determining the size and shape dimensions of a composite viewing operation region, in addition to the positions and shapes of the coextensively positioned viewing operation regions. For example, consider a viewing operation that includes some form of image size alteration such as an image scaling (e.g., magnification and downsizing) function accomplished by operating on the model data structure.

Figure 20:
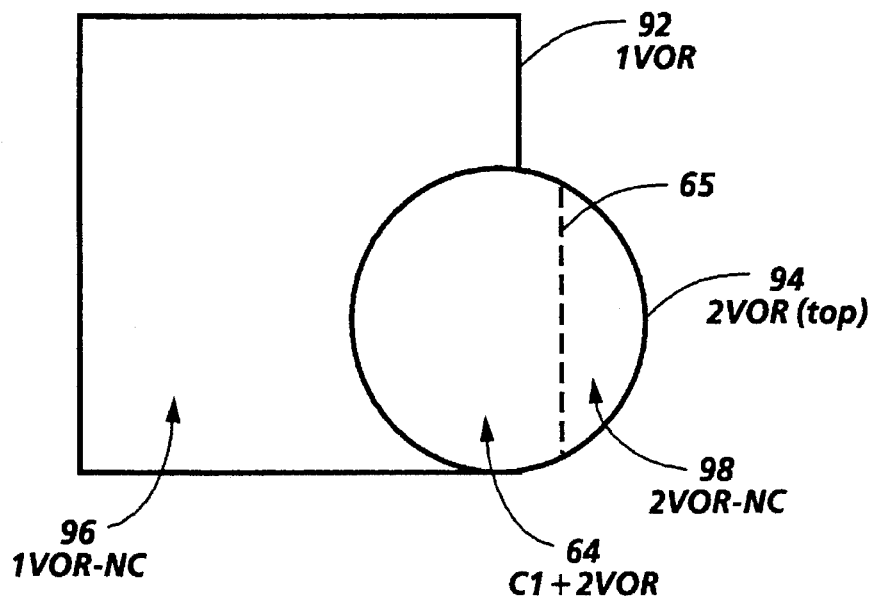
FIG. 20 illustrates a composite viewing operation region having size and shape dimensions affected by, and determined according to, a model-based image scaling viewing operation.

With reference to FIG. 20, when circular 2VOR 94, having an associated image magnification viewing operation, is positioned over rectangular 1VOR 92, the magnification viewing operation affects (enlarges) the appearance of 1VOR 92 in the manner shown in FIG. 20 by dotted line 65, affecting the computation of the C1+2VOR 64 as well as the non-composite portion 98 of 2VOR 94. If the magnification scale is large enough, it is possible that a sufficiently large portion of the 1VOR-SI presented in 1VOR 92 would be determined to be part of the C1+2VOR 64 so as to eliminate the non-composite image portion, 2VOR-NC 98, of 2VOR 94.

Figure 21:
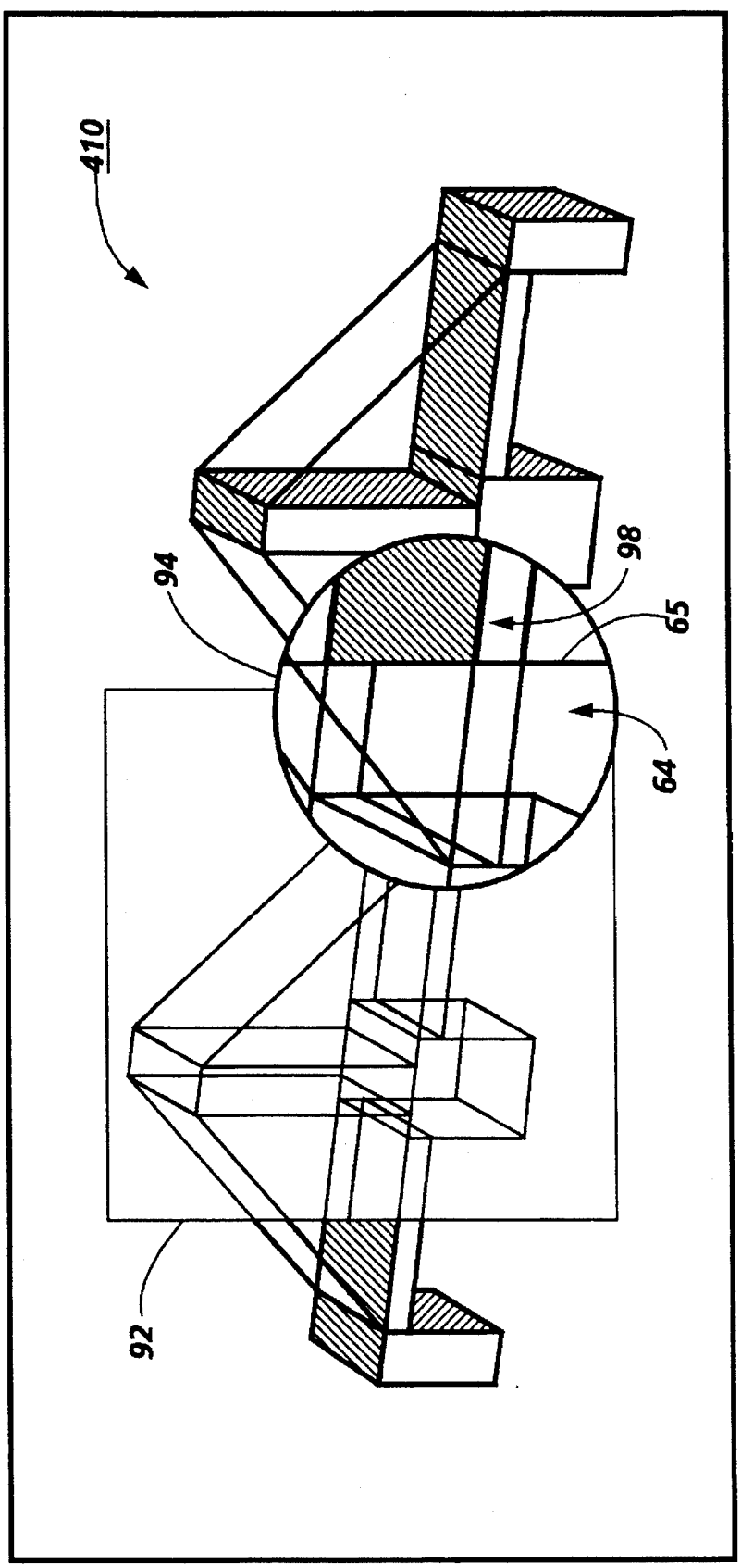
FIG. 21 illustrates a display screen showing the results of composing two viewing operations when the second viewing operation is a model-based image magnification operation.

FIG. 21 illustrates an example of how an image scaling viewing operation can affect the determination of the size and shape dimensions of the composite viewing operation region of a composite image. Image 410 shows a three-dimensional rendered image of a bridge structure rendered as a shaded image. 1VOR 92 is a viewing operation region having an associated viewing operation for rendering images in a wire-frame form, showing the internal structural components. The 1VOR-SI shows the bridge with its internal structure revealed. 2VOR 94 has a magnification viewing operation associated with it, and shows both the composite image 64 of the magnified portion of the wire-frame bridge structure, and the non-composite image 98 of the magnified portion of the shaded bridge structure within the boundary of the 2VOR 94, divided by region dividing line 65.

Figure 22:
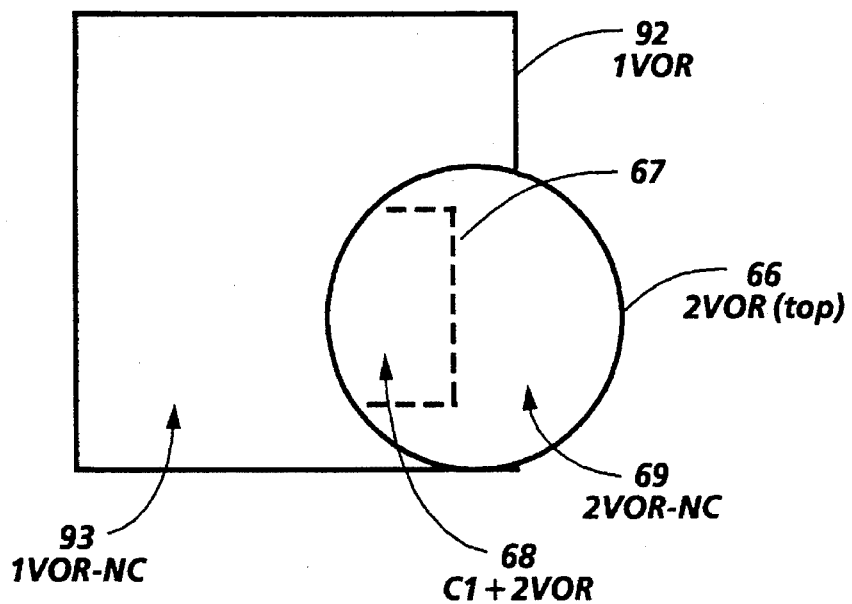
FIG. 22 illustrates a composite viewing operation region having size and shape dimensions affected by, and determined according to, a model-based image scaling viewing operation.

FIG. 22 illustrates an example of the affect of an "inverse magnification", or image downsizing, viewing operation on the determination of the size and shape dimensions of a composite viewing operation region. Circular 2VOR 66, having an associated image downsizing viewing operation, is positioned over rectangular 1VOR 92. The image downsizing viewing operation affects (shrinks) the appearance of 1VOR 92 in the manner shown in FIG. 22 by dotted line 67, affecting the computation of the C1+2VOR 68 as well as the non-composite portion 69 of 2VOR 66. If the reduction in image scale is large enough, it is possible that the entire 1VOR-SI presented in 1VOR 92 would be determined to be part of 2VOR 66, so that the C1+2VOR 68 and the region in which the 1VOR-SI are presented are identical. For image reduction where the entire 1VOR-SI presented in 1VOR 92 is determined to be part of the C1+2VOR 68, the composite image in C1+2VOR 68 would be surrounded by a 2VOR-NC-SI displayed in any remaining non-composite image portion, 2VOR-NC 69, but the 1VOR-NC-SI would also be produced and displayed in the remaining non-composite image portion 1VOR-NC 93 at the same time.

6. A user interface implementation and its system environment.

One embodiment of the method of the present invention has been implemented as a set of interactive user-controlled functions, or viewing operations, added to the functionality of a graphical object editor application software program which operates in a graphical user interface system environment. Each viewing operation in the implemented embodiment operates on the object-based model data structure of the graphical objects editor, hereafter called the graphical editor data structure, which has structural features similar to model data structure 860 described earlier. It is important to note that the method of the present invention may be implemented to operate in any of the variety of graphical user interfaces currently available for computer workstations and other types of machines having processors and displays, including personal computers, fully-featured copier-duplicators, production publishing machines, and image reproduction machines. Further, while the implemented embodiment operates on the object-based model data structure of a graphical objects editor, it is intended that the method may be implemented to operate in a wide variety of application environments.

The illustrated embodiment has been implemented on a Sun Microsystems SPARCstation 10 computer as a research software prototype application written in the Cedar programming environment, a Xerox proprietary research software environment, utilizing the Cedar programming language, and running on the SunOS UNIX®-compatible operating system. The Cedar programming environment provides application support for a graphical user interface environment including software functions both for presenting and managing images for display in plural workspaces or "windows" in the display area of the display, and for interfacing with at least one pointing device, to be manipulated by a user of the machine. The user uses the pointing device to communicate operational commands to the graphical user interface, and, through the interface, to each software application operating in each window.

The illustrated implementation also operates within the framework of an editing environment known as MMM (Multi-Device Multi-User Multi-Editor. MMM operates as a single window in the Cedar programming environment, and allows for multiple applications, including the graphics editor application, to execute as subwindows within the MMM window. MMM takes events from multiple input devices, such as a mouse and a trackball, keeps track of which device produced which event, and places all events on a single queue. It dequeues each event in order and determines to which application that event should be delivered. MMM applications are arranged in a hierarchy that indicates how they are nested on the screen. Each event is passed to the root application, which may pass the event on to one of its child applications, which may in turn pass the event on down the tree. Mouse events are generally delivered to the most deeply nested application whose screen region contains the mouse coordinates. However, when the user is dragging or resizing an object in a particular application, all mouse coordinates go to that application until the dragging or resizing is completed. Keyboard events go to the currently selected application. Additional information about the MMM environment may be found in Eric A. Bier and Steve Freeman, "MMM: A User Interface Architecture for Shared Editors on a Single Screen" in the Proceedings of the ACM SIGGRAPH Symposium on User Interface Software and Technology (Hilton Head, S.C., Nov. 11–13, 1991), ACM, New York, 1991, at pp 79–86.

In the illustrated implementation, the MMM editor is the root application and its window contains all other relevant application windows. In this case, those other applications include viewing operation 200 and Gargoyle graphics editor 120. MMM thus acts as a signal director between viewing operation 200 and application 120. In the illustrated implementation, viewing operation 200 is one of several tools that may be placed on a transparent overlay. The use of viewing of operation 400 in conjunction with the transparent overlay is described in more detail in concurrently filed, copending, and commonly assigned U.S. patent application Ser. No. 08/095,598 entitled "User Interface Having Movable Tool Sheet". For purposes of describing the illustrated embodiment herein, the processing interconnections between the viewing operation 200 and the transparent overlay are not significant and will not be discussed herein.

In addition, for simplification, the functionality of the MMM environment will be presumed to be incorporated directly into the window management system 112, and references to the "window manager 112" hereafter will presume to include the functionality of the MMM editor in the illustrated implementation.

Figure 23:
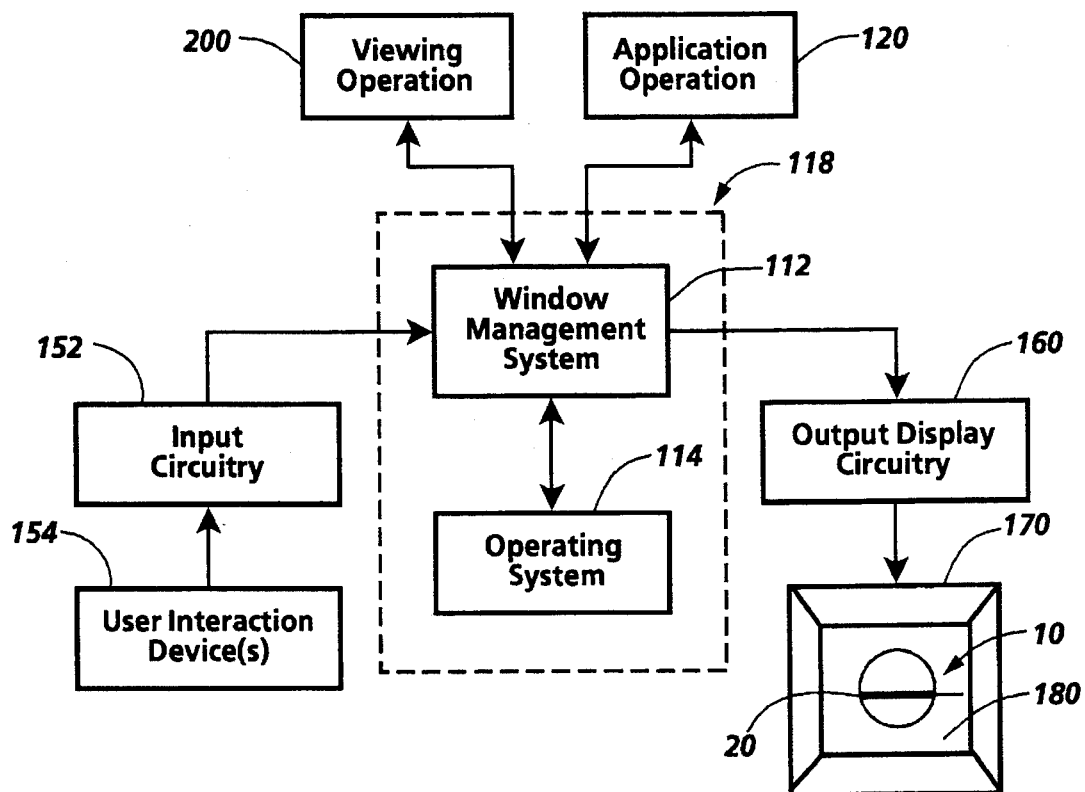
FIG. 23 is a block diagram illustrating the interaction between the systems components of an illustrated embodiment of the method of the present invention.

The underlying structure of the Cedar environment, designated collectively as reference numeral 118 in FIG. 23, is a collection of components that are arranged in hierarchical layers, supporting a well integrated, interactive environment in which lower level modules remain directly available to higher level, or "client" programs, callable as ordinary Cedar language procedures. In addition, a higher level Cedar component can supply a procedure value as a parameter to a lower level service procedure, which in turn can later invoke the higher level component to communicate with it as necessary.

Cedar environment 118 controls different application contexts controlled by processor 140 (FIG. 46) by separating them physically into different parts of one or more display screens. Application programs, such as the Gargoyle graphics editor 120, in the Cedar programming environment are called "clients" of the environment. The Cedar environment includes a high-level software window management system 112, hereafter called "window manager 112", which provides the necessary window management control for the application client programs that execute on the machine. Window manager 112 allows programmers and programs to create, destroy, move, and realize a hierarchical system of defined individual viewing areas in display area 180 of display device 170 called "windows". Each window is a region whose position and size is managed by the window manager 112, but whose contents are determined by the application which creates the window. Window manager 112 also permits the application to create nested subwindows to handle certain lower level functions within top level windows. Window manager 112 redisplays the contents of each window based on client-supplied specifications whenever the window's contents, size, or location changes. Windows are implemented by a client application as a set of window classes. A window class implementation provides operations to initialize a window, to save its contents, to destroy a window, to paint its contents on the display, and so on, and each member of a specific window class shares these same behaviors.

Viewing operation software 200 contains the software instructions for defining and implementing a viewing operation according to the method of the present invention and for interacting with the graphical editor data structure used by Gargoyle graphics editor 120 in order to produce the second image. Viewing operation 200 has been implemented to cooperate with the functionality of the Gargoyle graphics editor 120, and is a client of window manager 112. Each application client 200 and 120 exchanges data with user interaction device 154 and display 170, via window manager 112 by converting signals received from input circuitry 154 into a series of user input signals for directing control of processor 140 (FIG. 32) to perform the operations of Gargoyle graphics editor 120 and to perform viewing operation 400, including creating and drawing the viewing operation region 186 in the Gargoyle graphics editor window 211, on display 170, in response to request signals from the user.

The Cedar programming environment also includes a high-level, device independent graphics software application known as the Imager that provides high quality two-dimensional display of text, line art, and scanned images. The imaging model for the Imager is based on the Interpress page description language, which is similar to PostScript. The Imager handles all display output for window manager 112, as well as for all other application programs (not shown) implemented in the Cedar environment. The Imager supports the presentation of a variety of image material: text in various fonts, lines and curves of various thicknesses, strokes or enclosed outlines, sampled images, and various color models. Image transformations can scale, rotate, translate, and clip images through simple specifications. The device independent design permits images to be rendered on a variety of devices, some of which include full-color displays, color-mapped displays, black and white displays, and printers.

In the illustrated embodiment, window manager 112 includes input handler software (not shown) which collects, interprets, and parses the input data stream of user input requests and data into appropriate input signals for further action. Two modes of input handling are provided by window manager 112. In one mode, input signal management produces a single serial buffer of time-stamped input events from supported input devices, which in turn may be independently extracted by application 122 if needed for processing a particular user event or response. In the second mode, called the Terminal Input Processor (TIP), input signals are interpreted based on specifications that are parsed into TIP tables (not shown). For each event, or event sequence, a TIP table entry specifies a sequence of action tokens that represent the semantics of the event. In the MMM framework of the illustrated embodiment, the functionality of the TIP is handled in MMM, and Cedar's TIP is not used.

In the illustrated embodiment, a three-button mouse provides the primary method for a user to send signals to viewing operation 400 requesting the display of VOR 186. The mouse is connected in a conventional manner to user input circuitry 152. However, user interaction device 154 may include any suitable device for interacting with the viewing operation region 186 and other objects displayed on display device 170, including but not limited to pointing and cursor control devices for two and three-dimensional displays, such as a light pen, track ball, joystick, or data glove device, a touch screen display, and alphanumeric devices such as a keyboard. Alternatively, the user interaction device 154 may be a speech recognition device for speaking input, or a location sensing device for gestural input.

Additional information regarding the Cedar programming environment may be found in D. Swinehart et al., "A Structural View of the Cedar Programming Environment, *ACM Transactions on Programming Languages and Systems*, Vol. 8, No. 4, October 1986, pp. 419–490, and in W. Teitelman, "A Tour Through Cedar", *IEEE Software*, Volume 1, No. 2, April, 1984, pp. 44–73, both of which are hereby incorporated by reference herein. Additional information regarding the Gargoyle graphics editor may be found in K. Pier et al., "An Introduction to Gargoyle: An interactive Illustration Tool", *Proceedings of the Intl. Conf. on Electronic Publishing, Document Manipulation and Typography*, (Nice, France, April) Cambridge University Press, 1988, pp. 223–238, which is also hereby incorporated by reference herein.

Figure 23A:
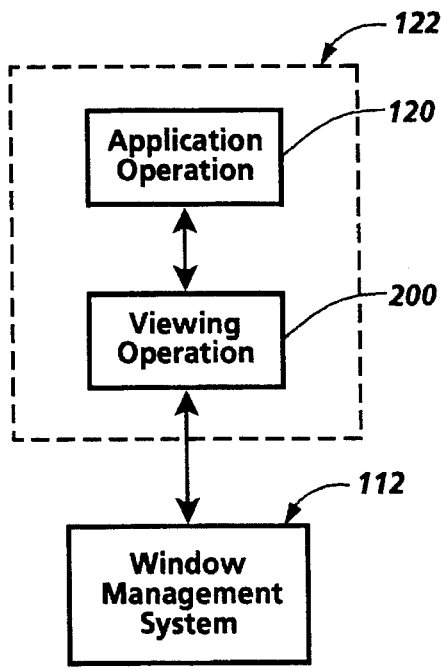
FIG. 23A is a portion of the block diagram in FIG. 23 illustrating an alternative implementation for the systems components of the illustrated embodiment of the method of the present invention.

In the illustrated embodiment, method 200 is implemented as a separate application, and the MMM editor handles any interaction between application 120 and method 200. However, as shown in FIG. 23A, the method of the present invention may also be implemented as a functional enhancement to application 120 which interacts with window management system 112 in graphical user interface environment 118, designated as collective entity 122.

In this implementation, the method of the present invention takes advantage of the graphics editor application software in the memory of the machine, and utilizes relevant portions of the application code to perform the viewing operation on the appropriate model data structure and to produce the image definition data defining the output (second or composite) image shown in boxes 324, 334, 364 and 372 in FIGS. 18 and 19. The details of this implementation are described more fully in the copending, concurrently filed patent applications listed above, and in particular in Ser. No. 08/096,521, "Method and Apparatus for Using the Model Data Structure of an Image to Produce Human Perceptible Output in the Context of the Image", incorporated by reference herein.

C. The machine and software product of the present invention.

Figure 24:
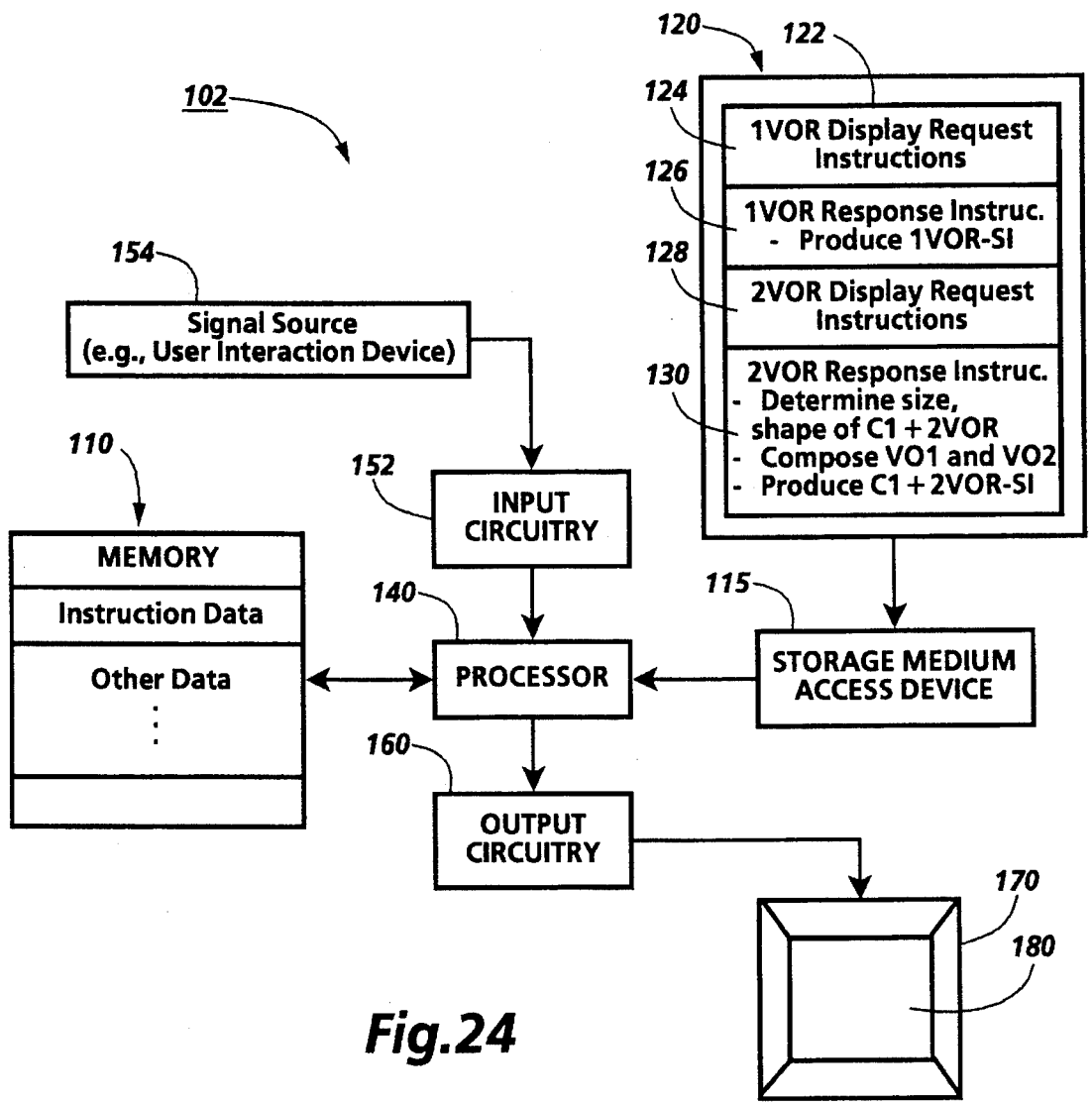
FIG. 24 illustrates a software product including a data storage medium for use in operating a representative processor controlled machine according to the method of the present invention.

The machine of the present invention includes a processor that is operated according to any of the methods previously described. The components, characteristics, and configuration of machine 100 has been described above in the discussion at part A.3 accompanying FIG. 32. FIG. 24 illustrates still another machine configuration of the present invention. Components of machine 102 in FIG. 24 that are functionally similar to machine components in machine 100 have the same reference numerals, and will not be described further here. Note that when the method of the present invention is implemented in a machine in which the user input device is a pointing or positioning device that eliminates the user's dependence on a keyboard device for the entry of signals, the machine of the present invention may be a pen-(stylus-) based computing machine, or a small, notebook- or palm-sized processor-controlled machine having a small display area for which a keyboard component is not suitable or not included.

Machine 102 includes storage medium access device 115. Storage medium access device 115 provides data from a data storage medium to processor 140. FIG. 24 also shows software product 120, an article of manufacture that can be used in a system that includes components like those shown in FIG. 24. Software product 120 includes data storage medium 122 that can be accessed by storage medium access device 115. Data storage medium 122 could, for example, be a magnetic medium such as a set of one or more floppy disks or PCMCIA memory storage, an optical medium such as a set of one or more CD-ROMs, or any other appropriate medium for storing data. Data storage medium 122 stores data that storage medium access device 115 can provide to processor 140. In addition to data storage medium 122, software product 120 includes data stored on storage medium 122. The stored data include data indicating user signal 1VOR and 2VOR display request instructions 124 and 126, which can be executed to display the 1VOR and 2VOR in display area 180, as shown, for example, in boxes 302 and 220 in FIGS. 1 and 10. The stored data also include data indicating response instructions 128, which can be executed to produce and provide composite image definition data for display in the C1+2VOR, such as shown in box 230 in FIG. 1, or in box 340 in FIG. 10.

D. Additional Considerations.

1. Producing composite images with more than two VORs.

Figure 25:
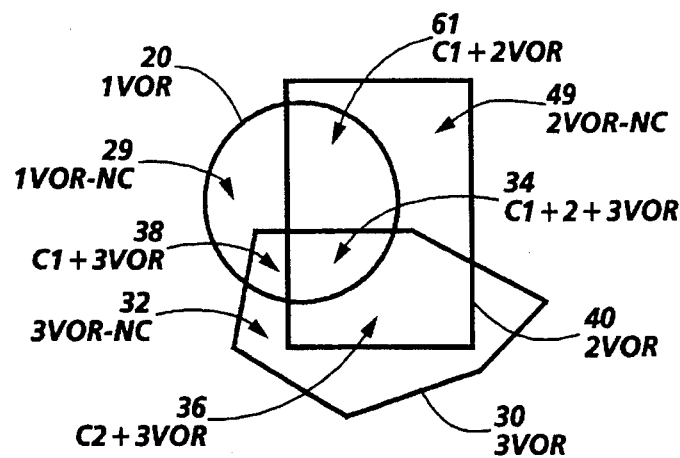
FIG. 25 shows the portions of viewing operation regions defined by coextensively positioning three viewing operation regions.

The illustrated embodiments showing two VORs and a single composite second image are not intended to limit the application or scope of the present invention in any way. The method and its variations illustrated above and encompassed by the appended claims may be expanded to apply to more than two viewing operation regions. FIG. 25 illustrates how the regions are allocated for three overlapping viewing operation regions. The irregularly shaped 3VOR 30 is closest to the machine user and overlaps both 2VOR 40 and 1VOR 20. Three new composite viewing operation regions are defined, shown as C1+3VOR 38, C1+2+3VOR 34 and C2+3VOR 36. Adding 3VOR 30 to the previously overlapping 1VOR 20 and 2VOR 40 of FIG. 6 also results in both the composite viewing operation region C1+2VOR 61 and the 1VOR-NC 29 having newly defined shape and size dimensions. The method of the present invention illustrated in FIGS. 1, 7, 10, 18 and 19 may be straightforwardly expanded to include producing composite and non-composite images for each of the newly added regions. For the composite region, C1+2+3VOR 34, the composite image may be produced according to method 300 illustrated in FIG. 10, using the overlapping order of the viewing operation regions to determine the order of composing the viewing operation functions.

2. Producing composite images using different model types.

In the "model-in model-out" implementations illustrated in FIGS. 10, 18 and 19, it is possible to have a viewing operation associated with a first viewing operation region that does not operate on the same model data structure as its input model data structure as another viewing operation associated with a second viewing operation region, such that the output model of the first viewing operation is not recognized or understood as a valid input model for the second viewing operation. The second viewing operation may be implemented to handle this in a manner suitable for the particular application. For example, the second viewing operation may simply not operate on the unknown input model, leaving, or passing, it unchanged, and may present the same second image in the composite viewing operation region that was presented by the VO1 in that portion of the 1VOR. Or, the second viewing operation may have the ability to convert the input model to the model type that it is capable of operating on. One example of the latter capability arises when a viewing operation operates on a standard graphics or page description language, such as PostScript or Interpress. When the method of the present invention is implemented as a set of features integrated with an application program, the application may be instructed to convert its model to the page description language model for input to a viewing operation whenever a viewing operation region requiring a page description language model is positioned over the image produced by the application program.

Figure 26:
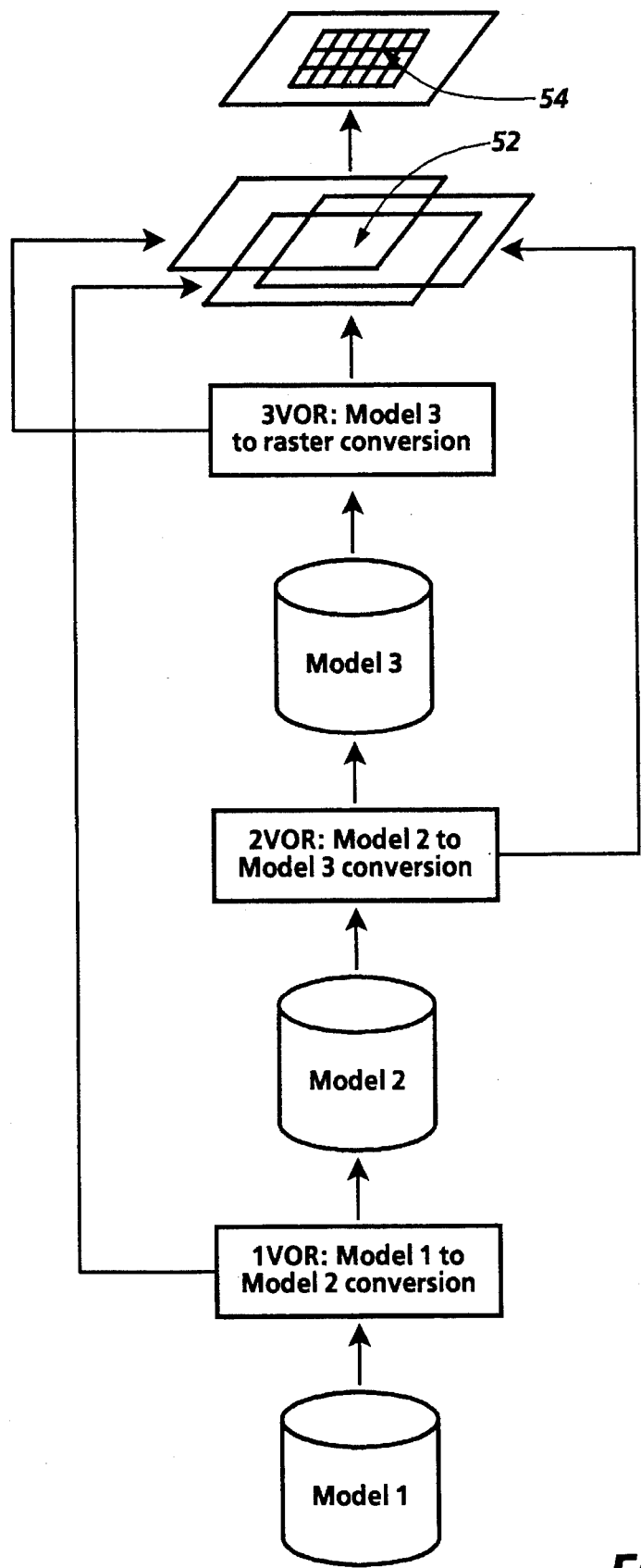
FIG. 26 is a block diagram illustrating the model-in, model-out implementation of producing a composite image according to the method of the present invention.

The viewing operations in a model-in, model-out implementation of the method of the present invention may be regarded as model conversion operations, converting an input model data structure to an output model data structure, which in turn becomes the input model to subsequent viewing operations. This is the intention expressed in method 300 shown in the flowchart of FIG. 10. In some cases, the output model may simply be a copy of the input model, as shown by example in the expansion of method 300 illustrated in FIGS. 18 and 19; or the output model may be a model that functions as a copy of the input model, but is not an entire copy; in other cases the output model will be a different type of output model altogether. In this manner, processing rules may be established for carrying out the proper ordering of the viewing operations on their respective input models for composing viewing operations, and for handling incompatibilities between input model and viewing operation. FIG. 26 illustrates this processing pipeline for three viewing operations for associated overlapping viewing operation regions. Each of the viewing operations produces image definition data defining an image for its respective viewing operation region boundary, and produces an output model; image definition data defining the composite image 54 for the composite viewing operation region 52 is determined from applying each viewing operation to its respective input model and using size and shape information about the composite viewing operation region 52.

A viewing operation does not necessarily clip its output model during its conversion from the input to the output model; an optimized implementation might make use of the region boundaries to convert only a part of the model, but a preferred implementation produces at least as much of the output model as is needed to fill its associated viewing operation region. It thus may become important in the implementation of the method chosen for determining how much of the input model is needed to convert to the output model to take into account the function of the viewing operation associated with each viewing operation region positioned "above" or "on top of" lower-level viewing operation regions when composing images. Thus, in general, the input model region of a group of composed (or coextensively positioned) VORs taken as a whole can be determined by applying the inverse of each respective viewing operation in the group to each respective VOR boundary.

3. Producing composite results using non-visual outputs.

As described in the copending, concurrently filed patent applications listed above, the method of the present invention is also intended to include the production of non-visual, human perceptible output such as audio output. A viewing operation associated with a viewing operation region may use data in the first image model data structure, located via the position of the viewing operation region over the first image, to produce human perceptible output other than the visual image output displayed in the viewing operation region. Where such viewing operations have been implemented, the method described herein for composing viewing operations is equally applicable, and a VO1 producing a visual image may be composed with a VO2 producing audio output, or two viewing operations each producing audio output may be composed.

It is evident that there has been provided in accordance with the present invention, a method that fully satisfies the aims and advantages hereinbefore set forth. While this invention has been described in conjunction with specific embodiments thereof, it is evident that many alternatives, modifications and variations will be apparent to those skilled in the art. Accordingly, the invention as herein described is intended to embrace all such alternatives, modifications and variations as fall within the scope of the appended claims.

What is claimed is:

1. A method of operating a machine; the machine including:

a signal source for producing signals indicating image display requests;

output circuitry connected to a display having a display area for presenting images; the display area having a first image displayed in a present image position therein;

a processor connected for receiving the signals from the signal source, and connected for providing images to the output circuitry; and memory for storing data; the data stored in the memory including:
   instruction data indicating instructions the processor executes; and
   a first image model data structure; the first image being produced from the first image model data structure;

the processor further being connected for accessing the data stored in the memory;

the display area further having displayed therein a first viewing operation region (1VOR) in a first viewing position coextensive with the present image position of a first image segment of the first image; the 1VOR having a second image (1VOR-SI) displayed therein; the 1VOR-SI having size and shape dimensions substantially the same as size and shape dimensions of the 1VOR; the 1VOR having a first viewing operation (VO1) associated therewith for mapping the first image model data structure to image definition data defining the 1VOR-SI;

the method comprising:

operating the processor to receive request signal data from the signal source indicating a display request to present a second viewing operation region (2VOR) in a second viewing position in the display area coextensive with the first viewing position of at least a portion of the 1VOR; the 2VOR having a second viewing operation (VO2) associated therewith for mapping an input model data structure to image definition data defining a second image for display in the 2VOR (2VOR-SI); and operating the processor to respond to the request signal data indicating the second display request by determining size and shape dimensions of the portion of the 2VOR in the second viewing position coextensive with the first viewing position of the 1VOR, designated as a composite viewing operation region (C1+2VOR), in the display area using the first and second viewing positions of the 1VOR and the 2VOR, respectively;

producing image definition data defining a composite image for display in the C1+2VOR (C1+2VOR-SI) according to a composite viewing operation and using the size and shape dimensions of the C1+2VOR; the composite viewing operation mapping the first image model data structure to the image definition data defining the composite image according to combined mappings of the VO1 on the first image model data structure and the VO2 on the input model data structure; the C1+2VOR-SI having the size and shape dimensions of the C1+2VOR; and providing the image definition data defining the C1+2VOR-SI to the output circuitry connected to the display so that the display presents the C1+2VOR-SI in the C1+2VOR substantially at the same time as the first image is being displayed in the display area;

whereby presentation of the composite image (C1+2VOR-SI) in the C1+2VOR gives the perception to the machine user of showing the results of applying the composite viewing operation to information presented in the first image segment.

2. The method of claim 1 wherein the act of operating the processor to respond to the second request signal data further includes determining size and shape dimensions of a remaining portion of the 1VOR in the first viewing position outside the second viewing position of the 2VOR, designated as a non-composite first viewing operation region (1VOR-NC), in the display area using the first and second viewing positions of the 1VOR and the 2VOR, respectively;

producing image definition data defining a second image for display in the 1VOR-NC (1VOR-NC-SI) according to the mapping defined by the VO1 using the first image model data structure and the size and shape dimensions of the 1VOR-NC;

determining size and shape dimensions of a remaining portion of the 2VOR in the second viewing position outside the C1+2VOR, designated as a non-composite second viewing operation region (2VOR-NC), in the display area using the first and second viewing positions of the 1VOR and the 2VOR, respectively;

producing image definition data defining a second image (2VOR-NC-SI) for display in the 2VOR-NC according to the mapping defined by the VO2 using the first image model data structure as the input model data structure and the size and shape dimensions of the 2VOR-NC; and providing the image definition data defining the 1VOR-NC-SI and the 2VOR-NC-SI to the output circuitry connected to the display so that the display presents the 1VOR-NC-SI in the 1VOR-NC and presents the 2VOR-NC-SI in the 2VOR-NC substantially at the same time as the C1+2VOR-SI is being displayed in the C1+2VOR and the first image is being displayed in the display area;

whereby presentation of the 1VOR-NC-SI, the 2VOR-NC-SI, and the C1+2VOR-SI substantially simultaneously gives the perception to the machine user of providing multiple views of the first image related to information in respective first image segments coextensive with viewing positions of the 1VOR-NC, C1+2VOR and 2VOR-NC in the display area.

3. The method of claim 1 wherein the act of producing the image definition data defining the C1+2VOR-SI according to the composite viewing operation includes producing a second model data structure according to the mapping defined by the VO1 using the first image model data structure; and producing the image definition data defining the C1+2VOR-SI according to the mapping defined by the VO2 using the second model data structure as the input model data structure.

4. The method of claim 1 wherein the first image, the 1VOR, and the 2VOR are arranged in the display area so as to have the appearance of being in different image planes; the first image having the appearance of being displayed in a first image plane; the 1VOR having the appearance of being displayed in a second image plane, in front of the first image plane; the 2VOR having the appearance of being displayed in a third image plane, in front of the second image plane; the 1VOR and the 2VOR arranged so as to have an overlapping order in the display area with respect to an image plane closest to the first image plane; and the act of producing the image definition data defining a composite image for display in the C1+2VOR according to a composite viewing operation includes combining the VO1 and the VO2 according to the overlapping order of the 1VOR and the 2VOR in the display area, beginning with the VO1 associated with the 1VOR in the image plane ordered closest to the first image plane.

5. A method of operating a machine; the machine including:

a signal source for producing signals indicating image display requests;

output circuitry connected to a display having a display area for presenting images; the display area having a first image displayed in a present image position therein;

a processor connected for receiving the signals from the signal source, and connected for providing images to the output circuitry; and memory for storing data; the data stored in the memory including:

instruction data indicating instructions the processor executes; and a first image model data structure; the first image being produced from the first image model data structure;

the processor further being connected for accessing the data stored in the memory;

the method comprising:

operating the processor to receive first request signal data from the signal source; the request signal data indicating a display request to present a first viewing operation region (1VOR) in a first viewing position in the display area coextensive with the present image position of a first image segment of the first image; the 1VOR having a first viewing operation (VO1) associated therewith for mapping a VO1 input model data structure to image definition data defining a second image for display in the 1VOR (1VOR-SI);

operating the processor to respond to the first request signal data indicating the display request by producing a second model data structure according to the VO1 using the first image model data structure as the VO1 input model data structure;

producing the image definition data defining a second image for display in the 1VOR (1VOR-SI) using the second model data structure; the 1VOR-SI having size and shape dimensions substantially identical to size and shape dimensions of the 1VOR; and providing the image definition data defining the 1VOR-SI to the output circuitry connected to the display device so that the display device presents the IVOR-SI in the 1VOR in response to the image definition data substantially at the same time as the first image is being displayed in the display area;

operating the processor to receive second request signal data from the signal source indicating a display request to present a second viewing operation region (2VOR) in a second viewing position in the display area coextensive with the first viewing position of at least a portion of the 1VOR; the 2VOR having a second viewing operation (VO2) associated therewith for mapping a VO2 input model data structure to image definition data defining a second image for display in the 2VOR (2VOR-SI); and operating the processor to respond to the second request signal data indicating the display request by determining size and shape dimensions of the portion of the 2VOR in the second viewing position coextensive with the first viewing position of the 1VOR, designated as a composite viewing operation region (C1+2VOR), in the display area using the first and second viewing positions of the 1VOR and the 2VOR, respectively;

producing image definition data defining a composite image for display in the C1+2VOR (C1+2VOR-SI) according to the VO2 using the second model data structure as the VO2 input model data structure and using the size and shape dimensions of the C1+2VOR; the C1+2VOR-SI having size and shape dimensions substantially identical to size and shape dimensions of the C1+2VOR; and providing the image definition data defining the C1+2VOR-SI to the output circuitry connected to the display so that the display presents the C1+2VOR-SI in the C1+2VOR substantially at the same time as the first image is being displayed in the display area;

whereby presentation of the composite image in the C1+2VOR gives the perception to the machine user of providing information in the composite image related to information included in both the first image segment and in the 1VOR-SI.

6. The method of claim 5 wherein the act of operating the processor to respond to the second request signal data further includes determining size and shape dimensions in the display area of a remaining portion of the 1VOR in the first viewing position outside the second viewing position of the 2VOR, designated as a non-composite first viewing operation region (1VOR-NC), using the first and second viewing positions of the 1VOR and the 2VOR, respectively;

producing image definition data defining a second image for display in the 1VOR-NC (1VOR-NC-SI) according to the VO1 using the first image model data structure as the VO1 input model data structure and using the size and shape dimensions of the 1VOR-NC;

determining size and shape dimensions in the display area of a remaining portion of the 2VOR in the second viewing position outside the C1+2VOR, designated as a non-composite second viewing operation region (2VOR-NC), using the first and second viewing positions of the 1VOR and the 2VOR, respectively;

producing image definition data defining a second image for display in the 2VOR-NC (2VOR-NC-SI) according to the VO2 using the first model data structure as the VO2 input model data structure and using the size and shape dimensions of the 2VOR-NC; and providing the image definition data defining the 1VOR-NC-SI and the 2VOR-NC-SI to the output circuitry connected to the display so that the display presents the 1VOR-NC-SI in the 1VOR-NC and presents the 2VOR-NC-SI in the 2VOR-NC substantially at the same time as the C1+2VOR-SI is being displayed in the C1+2VOR and the first image is being displayed in the display area;

whereby presentation of the 1VOR-NC-SI, the 2VOR-NC-SI, and the C1+2VOR-SI substantially simultaneously gives the perception to the machine user of providing information in multiple views of the first image related to information included in respective first image segments coextensive with viewing positions of the 1VOR-NC, C1+2VOR and 2VOR-NC in the display area.

7. The method according to claim 6 wherein, when the second viewing position of the 2VOR in the display area is substantially completely coextensive with the first viewing position of the 1VOR, the C1+2VOR includes substantially all of the 1VOR, and presentation of C1+2VOR-SI in the C1+2VOR gives the appearance to the machine user of replacing the 1VOR-SI with the C1+2VOR-SI.

8. The method according to claim 7 wherein the 2VOR in the second viewing position in the display area is coextensive with a second first-image segment (FIS-2) of the first image; and when the VO2 does not use the first image model data structure as a VO2 input model data structure, the act of producing image definition data defining the 2VOR-NC-SI for display in the 2VOR-NC includes reproducing image definition data defining the FIS-2 clipped to the size and shape dimensions of the 2VOR-NC;

whereby the presentation of the FIS-2 clipped to the size and shape dimensions of the 2VOR-NC gives the perception to the machine operator that the 2VOR-NC is transparent.

9. The method according to claim 5 wherein the act of producing the image definition data defining the composite image according to the VO2 includes producing a third model data structure according to the VO2 using the second model data structure as the VO2 input model data structure; and producing the image definition data defining the composite image using the third model data structure and using the size and shape dimensions of the C1+2VOR.

10. The method of claim 5 wherein the first image segment includes a first display feature representing a first feature data item in the first image model data structure; the VO1 mapping the first feature data item to an output feature data item included in the second model data structure; the output feature data item represented by an output display feature included in the 1VOR-SI; the output display feature also included in the C1+2VOR; and wherein the act of producing the image definition data defining the C1+2VOR-SI further includes obtaining a new attribute value for the output feature data item; the new attribute value indicating a modified output display feature; and producing the image definition data defining the C1+2VOR-SI using the new attribute value; the C1+2VOR-SI including the modified output display feature thereof indicated by the new attribute value;

whereby presenting the C1+2VOR-SI in the C1+2VOR gives the appearance to the machine user of replacing the output display feature included in the 1VOR-SI with the modified output display feature included in the C1+2VOR-SI.

11. The method according to claim 10 wherein the output display feature has first and second display feature positions in the display area; and wherein the act of operating the processor to produce the image definition data defining the C1+2VOR-SI further includes, when one of the first and second display feature positions of the output display feature is coextensive with image display positions in the display area inside the C1+2VOR and the other of the first and second display feature positions is coextensive with image display positions in the display area outside the C1+2VOR, producing the image definition data defining the C1+2VOR-SI so that the C1+2VOR-SI includes the modified output display feature only for the display feature positions of the output display feature coextensive with image display positions inside the C1+2VOR;

whereby the output display feature appears unmodified in the 1VOR outside the C1+2VOR.

12. The method of claim 5 wherein the signal source includes input circuitry connected to a user input device for receiving signals indicating actions of a machine user; and the act of operating the processor to receive the first and second request signal data includes receiving the first and second request signal data from the user input device.

13. The method according to claim 12 wherein the first and second request signal data from the user input device include first and second movement signals indicating first and second movement actions by the machine user; the first movement action moving the 1VOR from a first position in the display area to the first viewing position coextensive with the present image position of the first image segment; the second movement action moving the 2VOR from a second position in the display area to the second viewing position coextensive with the first viewing position of at least a portion of the 1VOR.

14. The method according to claim 5 wherein the data stored in the memory further includes instruction data defining an application operation; the application operation being capable of producing the C1+2VOR-SI according to the VO2 using the second model data structure; and the act of producing the image definition data defining the C1+2VOR-SI according to the VO2 includes operating the processor to perform the application operation using the second model data structure to produce the C1+2VOR-SI.

15. A method of operating a machine; the machine including:

a signal source connected to input circuitry for producing signals indicating image display requests;

output circuitry connected to a display having a display area for presenting images; the display area having a first image displayed in a present image position therein; the first image including a first display object having a present object position in the first image;

a processor connected for receiving the signals from the input circuitry and the signal source, and connected for providing image definition data defining images to the output circuitry; and memory for storing data; the data stored in the memory including:

instruction data indicating instructions the processor executes; and a first image model data structure used for producing the first image; the first image model data structure being an object-based model data structure including a first object data item represented by the first display object in the first image, and an object coordinate data item indicating display object coordinate information about the present object position of the first display object in the first image; the object coordinate data item indicating the first object data item; and the processor further being connected for accessing the data stored in the memory;

the method comprising:

operating the processor to receive first request signal data from the signal source; the request signal data indicating a display request to present a first viewing operation region (1VOR) in a first viewing position in the display area coextensive with the present image position of a first image segment of the first image including the first display object;

operating the processor to respond to the first request signal data indicating the display request by obtaining the first object data item from the first image model data structure using the present object position of the first display object in the first image segment and the object coordinate data item;

producing an object-based second model data structure using the first object data item; the second model data structure including an output object coordinate data item indicating output display object coordinate information about the output object position of an output display object in a second image for display in the 1VOR (1VOR-SI); the output object coordinate data item indicating the output object data item;

producing image definition data defining the 1VOR-SI including the output display object using the second model data structure; the 1VOR-SI having size and shape dimensions substantially identical to size and shape dimensions of the 1VOR; and providing the image definition data defining the 1VOR-SI to the output circuitry connected to the display device so that the display device presents the 1VOR-SI, including the output display object, in the 1VOR in the first viewing position in the display area in response to the image definition data substantially at the same time as the first image is being displayed in the display area;

operating the processor to receive second request signal data from the signal source indicating a display request to present a second viewing operation region (2VOR) in a second viewing position in the display area coextensive with at least a portion of the 1VOR in the first viewing position; and operating the processor to respond to the second request signal data indicating the display request by determining size and shape dimensions of the portion of the 1VOR in the first viewing position coextensive with the second viewing position of the 2VOR, designated as a composite viewing operation region (C1+2VOR), in the display area using the first and second viewing positions of the 1VOR and the 2VOR, respectively;

producing image definition data defining a composite second image (C1+2VOR-SI) for display in the C1+2VOR using the second model data structure and the size and shape dimensions of the C1+2VOR; and providing the image definition data defining the C1+2VOR-SI to the output circuitry connected to the display so that the display presents the C1+2VOR-SI in the C1+2VOR substantially at the same time as the first image is being displayed in the display area;

whereby presentation of the composite second image in the C1+2VOR gives the perception to the machine user of providing information in the composite second image related to both the first display object in the first image segment and to the output display object included in the 1VOR-SI.

16. The method of claim 15 wherein the act of operating the processor to respond to the second request signal data further includes determining size and shape dimensions of a remaining portion of the 1VOR in the first viewing position outside the second viewing position of the 2VOR in the display area, designated as a non-composite first viewing operation region (1VOR-NC), using the first and second viewing positions of the 1VOR and the 2VOR, respectively;

producing image definition data defining a second image (1VOR-NC-SI) for display in the 1VOR-NC using the first image model data structure and the size and shape dimensions of the 1VOR-NC;

determining size and shape dimensions of a remaining portion of the 2VOR in the second viewing position outside the C1+2VOR in the display area, designated as a non-composite second viewing operation region (2VOR-NC), using the first and second viewing positions of the 1VOR and the 2VOR, respectively;

producing image definition data defining a second image (2VOR-NC-SI) for display in the 2VOR-NC using the first image model data structure and the size and shape dimensions of the 2VOR-NC; and providing the image definition data defining the 1VOR-NC-SI and the 2VOR-NC-SI to the output circuitry connected to the display so that the display presents the 1VOR-NC-SI in the 1VOR-NC and presents the 2VOR-NC-SI in the 2VOR-NC substantially at the same time as the C1+2VOR-SI is being displayed in the C1+2VOR and the first image is being displayed in the display area;

whereby presentation of the 1VOR-NC-SI, the 2VOR-NC-SI, and the C1+2VOR-SI substantially simultaneously gives the perception to the machine user of providing information in multiple views of the first image related to display objects included in respective first image segments coextensive with viewing positions of the 1VOR-NC, C1+2VOR and 2VOR-NC in the display area.

17. The method of claim 15 wherein the first display object in the first image segment includes a first display feature representing a first feature data item in the first image model data structure; the first object data item in the first image model data structure indicating the first feature data item;

the act of producing the object-based second model data structure using the first object data item includes obtaining a first new attribute value for the first feature data item; the first new attribute value indicating a modified first display feature; and producing an output feature data item having the first new attribute value for including in the second model data structure; the output object data item indicating the output feature data item;

the act of producing the image definition data defining the 1VOR-SI includes using the first new attribute value for the output feature data item; the output display object included in the 1VOR-SI being the first display object having a modified first display feature thereof indicated by the first new attribute value; and the act of producing the image definition data defining the C1+2VOR-SI includes obtaining, from the second model data structure, the output object data item represented by the output display object included in the C1+2VOR using the output object position of the output display object and the object coordinate data item;

obtaining the output feature data item from the output object data item in the second model data structure;

obtaining a second new attribute value for the output feature data item; the second new attribute value indicating a modified output display feature; and producing the image definition data defining the C1+2VOR-SI using the second model data structure and the second new attribute value for the output feature data item; the C1+2VOR-SI including the modified output display feature thereof indicated by the second new attribute value;

whereby presenting the C1+2VOR-SI in the C1+2VOR gives the appearance to the machine user of replacing the first display object in the first image segment with composite modifications to the first display object in the C1+2VOR-SI.

18. A method of operating a machine; the machine including:

a user input device for receiving signals indicating actions of a machine user;

a display having a display area for presenting images; the display area having a first image displayed in a present image position therein; the first image including a first display object having a first display feature;

a processor connected for receiving the signals from the input device, and connected for providing image definition data defining images to the display; and memory for storing data; the data stored in the memory including:

instruction data indicating instructions the processor executes; and a first image model data structure used for producing the first image; the first image model data structure including a first object data item represented by the first display object in the first image; the first object data item indicating a display feature attribute data item having a present attribute value indicating the first display feature when displayed in the display area;

the processor further being connected for accessing the data stored in the memory;

the method comprising:

operating the processor to provide to the display first viewing operation region image data defining a first viewing operation region image so that the display presents a first viewing operation region (1VOR) in a first position in the display area;

operating the processor to receive first user signal data from the user input device indicating a first movement action by the machine user moving the 1VOR from the first position in the display area to a first viewing position coextensive with the present image position of a first image segment of the first image; the first image segment including the first display object;

operating the processor to respond to the movement of the 1VOR by providing image definition data defining a second image (1VOR-SI) to the display so that the display presents the 1VOR-SI in the 1VOR in response to the image definition data; the 1VOR-SI having size and shape dimensions substantially identical to size and shape dimensions of the 1VOR and showing the first display object having a once-modified first display feature representing a first new attribute value for the display feature attribute data item;

operating the processor to provide to the display second viewing operation region image data defining a second viewing operation region image so that the display presents a second viewing operation region (2VOR) in a second position in the display area;

operating the processor to receive second user signal data from the user input device indicating a second movement action by the machine user moving the 2VOR from the second position in the display area to a second viewing position coextensive with at least a portion of the first viewing position of the 1VOR; the portion of the 1VOR in the first viewing position coextensive with the second viewing position of the 2VOR being designated as a composite viewing operation region (C1+2VOR), and including the first display object having the once-modified first display feature; and operating the processor to respond to the movement of the 2VOR by providing image definition data defining a composite second image (C1+2VOR-SI) to the display so that the display presents the C1+2VOR-SI in the C1+2VOR in response to the image definition data; the C1+2VOR-SI having size and shape dimensions substantially identical to size and shape dimensions of the C1+2VOR and showing the first display object having a twice-modified first display feature representing a second new attribute value for the display feature attribute data item;

whereby presentation of the composite second image in the C1+2VOR gives the perception to the machine user of composing in one image first and second modifications related to the first display object in the first image segment.

19. The method according to claim 18 wherein the 1VOR-SI is produced using an object-based second model data structure copied from the first model data structure; the second model data structure including an output display feature attribute data item copied from the display feature attribute data item and having the first new attribute value therefor; the once-modified first display feature representing the output display feature attribute data item having the first new attribute value; and the C1+2VOR-SI is produced using the second model data structure; the twice-modified first display feature in the C1+2VOR-SI representing the output display feature attribute data item having the second new attribute value.

20. The method according to claim 18 wherein the act of operating the processor to respond to the movement of the 2VOR further includes determining size and shape dimensions of a remaining portion of the 1VOR in the first viewing position outside the second viewing position of the 2VOR in the display area, designated as a non-composite first viewing operation region (1VOR-NC), using the first and second viewing positions of the 1VOR and the 2VOR, respectively;

producing image definition data defining a second image (1VOR-NC-SI) for display in the 1VOR-NC using the first image model data structure and the size and shape dimensions of the 1VOR-NC;

determining size and shape dimensions of a remaining portion of the 2VOR in the second viewing position outside the C1+2VOR in the display area, designated as a non-composite second viewing operation region (2VOR-NC), using the first and second viewing positions of the 1VOR and the 2VOR, respectively;

producing image definition data defining a second image (2VOR-NC-SI) for display in the 2VOR-NC using the first image model data structure and the size and shape dimensions of the 2VOR-NC; and providing the image definition data defining the 1VOR-NC-SI and the 2VOR-NC-SI to the output circuitry connected to the display so that the display presents the 1VOR-NC-SI in the 1VOR-NC and presents the 2VOR-NC-SI in the 2VOR-NC substantially at the same time as the C1+2VOR-SI is being displayed in the C1+2VOR and the first image is being displayed in the display area;

whereby presentation of the 1VOR-NC-SI, the 2VOR-NC-SI, and the C1+2VOR-SI substantially simultaneously gives the perception to the machine user of providing information in multiple views of the first image related to display objects included in respective first image segments coextensive with viewing positions of the 1VOR-NC, C1+2VOR and 2VOR-NC in the display area.

21. The method according to claim 18 wherein the first display object has first and second display object positions in the display area; and wherein the act of operating the processor to provide the image definition data defining the C1+2VOR-SI further includes, when one of the first and second display object positions of the first display object is coextensive with image display positions in the display area inside the C1+2VOR and the other of the first and second display object positions is coextensive with image display positions outside the C1+2VOR, producing the image definition data defining the C1+2VOR-SI so that the C1+2VOR-SI includes the first display object having the twice-modified first display feature only for the display object positions of the first display object coextensive with the image display positions inside the C1+2VOR.

22. A method of operating a machine; the machine including:

input circuitry connected to a user input device; the input circuitry receiving signals indicating requests of a machine user;

output circuitry connected to a display having a display area for presenting images; the display area having a first image displayed in a present image position therein; the first image including a first display object having a first display feature;

a processor connected for receiving the signals from the input circuitry, and connected for providing image definition data defining images to the output circuitry; and memory for storing data; the data stored in the memory including:

a first image model data structure used for producing the first image; the first image model data structure including a first object data item represented by the first display object in the first image; the first object data item indicating a display feature attribute data item having a present attribute value indicating the first display feature when displayed in the display area; and instruction data indicating instructions the processor executes; the instruction data including first image application instruction data defining an application operation capable of producing the first image from the first image model data structure;

the processor further being connected for accessing the data stored in the memory;

the method comprising:

operating the processor to receive first request signal data from the input circuitry indicating a display request by the machine user to display a first viewing operation region (1VOR) in a first viewing position in the display area coextensive with the present image position of a first image segment of the first image; the first image segment including the first display object;

operating the processor to respond to the first request signal data indicating the display request by performing the acts of obtaining a first new attribute value for the display feature attribute data item; the first new attribute value indicating a modified first display feature;

copying the first image model data structure to a copied first image model data structure; the copied first image model data structure including a copied first object data item indicating a copied display feature attribute data item having the present attribute value indicating the first display feature;

obtaining the copied first object data item and the copied display feature attribute data item from the copied first image model data structure;

replacing the present attribute value of the copied display feature attribute data item with the first new attribute value in the copied first image model data structure;

obtaining second image size-and-position data from the first viewing position of the 1VOR in the display area; the second image size-and-position data indicating size and position information about a second image for display in the 1VOR (1VOR-SI);

executing the first image application instruction data defining the application operation to produce image definition data defining the 1VOR-SI using the second image size-and-position data and the copied first image model data structure including the first new attribute value for the copied display feature attribute data item; the 1VOR-SI including the first display object having a once-modified first display feature; the 1VOR-SI having size and shape dimensions substantially identical to size and shape dimensions of the 1VOR; and providing the image definition data defining the 1VOR-SI to the output circuitry connected to the display so that the display presents the 1VOR-SI in the 1VOR; the 1VOR-SI being displayed substantially at the same time as the first image is being displayed in the display area;

operating the processor to receive second request signal data from the input circuitry indicating a display request by the machine user to present a second viewing operation region (2VOR) in a second viewing position in the display area coextensive with the first viewing position of at least a portion of the 1VOR including the first display object having the once-modified display feature; and operating the processor to respond to the second request signal data indicating the display request by determining size and shape dimension data indicating size and shape dimensions and position information of the portion of the 2VOR in the second viewing position coextensive with the first viewing position of the 1VOR, designated as a composite viewing operation region (C1+2VOR), in the display area using the first and second viewing positions of the 1VOR and the 2VOR, respectively;

obtaining a second new attribute value for the copied display feature attribute data item; the second new attribute value indicating a twice-modified first display feature;

obtaining the copied first object data item and the copied display feature attribute data item from the copied first image model data structure using the size and shape dimension data;

replacing the first new attribute value of the copied display feature attribute data item with the second new attribute value in the copied first image model data structure;

executing the first image application instruction data defining the application operation to produce image definition data defining a second image for display in the C1+2VOR (C1+2VOR-SI) using the size and shape dimension data of the C1+2VOR and the copied first image model data structure including the second new attribute value for the copied display feature attribute data item; the C1+2VOR-SI, designated as a composite image, including the first display object having the twice-modified first display feature and having size and shape dimensions substantially identical to size and shape dimensions of the C1+2VOR; and providing the image definition data defining the C1+2VOR-SI to the output circuitry connected to the display so that the display presents the C1+2VOR-SI in the C1+2VOR substantially at the same time as the first image is being displayed in the display area;

whereby, in response to the display request by the machine user, presentation of the composite second image (C1+2VOR-SI) in the C1+2VOR gives the perception to the machine user of replacing the first display object having the first display feature in the first image segment with the first display object having modifications composed from both first and second viewing operation regions in the C1+2VOR.

23. The method according to claim 22 wherein the act of operating the processor to respond to the request signal data indicating the display request further includes storing the copied first image model data structure in the memory of the machine.

24. A machine comprising:

input circuitry connected to a user input device; the input circuitry receiving signals indicating requests of a machine user;

output circuitry connected to a display having a display area for presenting images; the display area having a first image displayed in a present image position therein;

a processor connected for receiving the signals from the input circuitry, and connected for providing image definition data defining images to the output circuitry for presentation by the display; and memory for storing data; the data stored in the memory including:

instruction data indicating instructions the processor can execute; and a first image model data structure; the first image being produced from the first image model data structure;

the processor being further connected for accessing the data stored in the memory;

the processor, in executing the instructions, receiving first request signal data from the input circuitry indicating a first display request by the machine user to display a first viewing operation region (1VOR) in a first viewing position in the display area coextensive with the present image position of a first image segment of the first image; the 1VOR having a first viewing operation (VO1) associated therewith for mapping the first image model data structure to image definition data defining a second image for display in the 1VOR (1VOR-SI);

the processor further, in executing the instructions, responding to the first request signal data indicating the first display request by producing the image definition data defining the 1VOR-SI according to the VO1 using the first image model data structure; the 1VOR-SI having size and shape dimensions substantially identical to size and shape dimensions of the 1VOR; and providing the image definition data defining the 1VOR-SI to the output circuitry connected to the display device so that the display device presents the 1VOR-SI in the 1VOR in the first viewing position in the display area in response to the image definition data substantially at the same time as the first image is being displayed in the display area;

the processor further, in executing the instructions, receiving second request signal data from the input circuitry indicating a second display request by the machine user to present a second viewing operation region (2VOR) in a second viewing position in the display area coextensive with the first viewing position of at least a portion of the 1VOR; the 2VOR having a second viewing operation (VO2) associated therewith for mapping the first image model data structure to image definition data defining a second image for display in the 2VOR (2VOR-SI); and the processor further, in executing the instructions, responding to the second request signal data indicating the second display request by determining size and shape dimensions of the portion of the 2VOR in the second viewing position coextensive with the first viewing position of the 1VOR, designated as a composite viewing operation region (C1+2VOR), in the display area using the first and second viewing positions of the 1VOR and the 2VOR, respectively;

composing the VO1 and the VO2 into a composite viewing operation mapping the first image model data structure to image definition data defining a second image for display in the C1+2VOR (C1+2VOR-SI) according to combined mappings of the VO1 and the VO2 on the first image model data structure; the C1+2VOR-SI being designated as a composite image;

producing the image definition data defining the C1+2VOR-SI according to the composite viewing operation using the size and shape dimensions of the C1+2VOR and the first image model data structure; the C1+2VOR-SI having the size and shape dimensions of the C1+2VOR; and providing the image definition data defining the C1+2VOR-SI to the output circuitry connected to the display so that the display presents the C1+2VOR-SI in the C1+2VOR substantially at the same time as the first image is being displayed in the display area;

whereby the processor, in executing the instructions, causes presentation of the composite second image (C1+2VOR-SI) in the C1+2VOR, showing the results of applying the composite viewing operation composed from the viewing operations associated with the 1VOR and the 2VOR to information presented in the first image segment, in response to the second display request by the machine user.

25. A machine comprising:

input circuitry connected to a user input device; the input circuitry receiving signals indicating requests of a machine user;

output circuitry connected to a display having a display area for presenting images; the display area having a first image displayed in a present image position therein; the first image including a first display feature;

a processor connected for receiving the signals from the input circuitry, and connected for providing image definition data defining images to the output circuitry for presentation by the display; and memory for storing data; the data stored in the memory including:

instruction data indicating instructions the processor can execute; and a first image model data structure including a first feature data item; the first image being produced from the first image model data structure; the first display feature representing the first feature data item;

the processor being further connected for accessing the data stored in the memory;

the processor, in executing the instructions, receiving first request signal data from the user input device; the first request signal data indicating a first display request by the machine user to present a first viewing operation region (1VOR) in a first viewing position in the display area coextensive with the present image position of a first image segment of the first image including the first display feature;

the processor further, in executing the instructions, responding to the first request signal data indicating the first display request by producing a second model data structure using the first feature data item from the first image model data structure; the second model data structure including an output feature data item produced using the first feature data item;

producing the image definition data defining a second image for display in the 1VOR (1VOR-SI) using the second model data structure including the output feature data item; the 1VOR-SI including an output display feature representing the output feature data item, and having size and shape dimensions substantially identical to size and shape dimensions of the 1VOR; and providing the image definition data defining the 1VOR-SI to the output circuitry connected to the display device so that the display device presents the 1VOR-SI, including the output display feature, in the 1VOR in the first viewing position in the display area in response to the image definition data substantially at the same time as the first image is being displayed in the display area;

the processor further, in executing the instructions, receiving second request signal data from the user input device indicating a second display request by the machine user to present a second viewing operation region (2VOR) in a second viewing position in the display area coextensive with the first viewing position of at least a portion of the 1VOR; and the processor further, in executing the instructions, responding to the second request signal data indicating the second display request by determining size and shape dimensions of the portion of the 2VOR in the second viewing position coextensive with the first viewing position of the 1VOR, designated as a composite viewing operation region (C1+2VOR), in the display area using the first and second viewing positions of the 1VOR and the 2VOR, respectively;

producing image definition data defining a second image for display in the C1+2VOR (C1+2VOR-SI) using the second model data structure and using the size and shape dimensions of the C1+2VOR; the C1+2VOR-SI being designated as a composite image; and providing the image definition data defining the C1+2VOR-SI to the output circuitry connected to the display so that the display presents the C1+2VOR-SI in the C1+2VOR substantially at the same time as the first image is being displayed in the display area;

whereby the processor, in executing the instructions, causes presentation of the composite second image (C1+2VOR-SI) in the C1+2VOR, showing information therein related to both the first display feature included in the first image segment and the output display feature included in the 1VOR-SI, in response to the second display request by the machine user.

26. An article of manufacture for use in a machine that includes:

a display having a display area for presenting images to a machine user; the display area having a first image including a first display feature displayed in a first image position therein;

a user input device for receiving signals indicating actions of the machine user;

memory for storing data; the data stored in the memory including a first image model data structure used for producing the first image; the first image model data structure including a first feature data item represented by the first display feature object in the first image;

a storage medium access device for accessing a medium that stores data; and a processor connected for receiving data from the user input device, for providing data defining images to the display, and for accessing the data stored in the memory; the processor further being connected for receiving data from the storage medium access device;

the article comprising:

a data storage medium that can be accessed by the storage medium access device when the article is used in the machine; and data stored in the data storage medium so that the storage medium access device can provide the stored data to the processor when the article is used in the machine; the stored data comprising instruction data indicating instructions the processor can execute;

the processor, in executing the instructions, receiving first request signal data from the user input device indicating a first display request by the machine user to present a first viewing operation region (1VOR) in a first viewing position in the display area coextensive with the present image position of a first image segment of the first image including the first display feature;

the processor further, in executing the instructions, responding to the first request signal data indicating the first display request by producing a second model data structure using the first feature data item from the first image model data structure; the second model data structure including an output feature data item produced using the first feature data item;

producing the image definition data defining a second image for display in the 1VOR (1VOR-SI) using the second model data structure including the output feature data item; the 1VOR-SI including an output display feature representing the output feature data item, and having size and shape dimensions substantially identical to size and shape dimensions of the 1VOR; and providing the image definition data defining the 1VOR-SI to the output circuitry connected to the display device so that the display device presents the 1VOR-SI, including the output display feature, in the 1VOR in the first viewing position in the display area in response to the image definition data substantially at the same time as the first image is being displayed in the display area;

the processor further, in executing the instructions, receiving second request signal data from the user input device indicating a second display request by the machine user to present a second viewing operation region (2VOR) in a second viewing position in the display area coextensive with the first viewing position of at least a portion of the 1VOR; and the processor further, in executing the instructions, responding to the second request signal data indicating the second display request by determining size and shape dimensions of the portion of the 2VOR in the second viewing position coextensive with the first viewing position of the 1VOR, designated as a composite viewing operation region (C1+2VOR), in the display area using the first and second viewing positions of the 1VOR and the 2VOR, respectively;

producing image definition data defining a second image for display in the C1+2VOR (C1+2VOR-SI) using the second model data structure and using the size and shape dimensions of the C1+2VOR; the C1+2VOR-SI being designated as a composite image; and providing the image definition data defining the C1+2VOR-SI to the output circuitry connected to the display so that the display presents the C1+2VOR-SI in the C1+2VOR substantially at the same time as the first image is being displayed in the display area;

whereby the processor, in executing the instructions indicated by the instruction data stored in the data storage medium, causes, in response to the second display request by the machine user, presentation of the composite second image (C1+2VOR-SI) in the C1+2VOR, showing information therein related to both the first display feature included in the first image segment and the output display feature included in the 1VOR-SI.

* * * * *